United States Patent
Kim et al.

(10) Patent No.: US 11,670,245 B2
(45) Date of Patent: Jun. 6, 2023

(54) LOW-POWER DRIVING DISPLAY DEVICE AND DRIVING METHOD OF SAME

(71) Applicant: LG Display Co., Ltd., Seoul (KR)

(72) Inventors: Daehwan Kim, Paju-si (KR); Jeongho Kang, Paju-si (KR); Yongjin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/545,964

(22) Filed: Dec. 8, 2021

(65) Prior Publication Data

US 2022/0208123 A1    Jun. 30, 2022

(30) Foreign Application Priority Data

Dec. 28, 2020 (KR) .................. 10-2020-0184853

(51) Int. Cl.
| | | |
|---|---|---|
| G09G 3/3291 | (2016.01) | |
| G06F 3/044 | (2006.01) | |
| G09G 3/36 | (2006.01) | |
| G06F 3/041 | (2006.01) | |

(52) U.S. Cl.
CPC .......... *G09G 3/3291* (2013.01); *G06F 3/044* (2013.01); *G06F 3/0412* (2013.01); *G09G 3/3688* (2013.01); *G09G 2310/0272* (2013.01); *G09G 2310/0275* (2013.01); *G09G 2310/0291* (2013.01); *G09G 2330/021* (2013.01); *G09G 2330/045* (2013.01)

(58) Field of Classification Search
CPC .............. G09G 3/3291; G09G 3/3688; G09G 2310/0272; G09G 2310/0275; G09G 2310/0291; G09G 2330/021; G09G 2330/045; G06F 3/0412; G06F 3/044
See application file for complete search history.

(56) References Cited

U.S. PATENT DOCUMENTS 4,592,057 A     5/1986  Comerford
5,986,489 A  *  11/1999 Raza ............... H03K 19/00361
                                              326/82
(Continued)

FOREIGN PATENT DOCUMENTS

CN           1417769 A      5/2003
CN         111798783 A     10/2020
(Continued)

OTHER PUBLICATIONS

China National Intellectual Property Administration, Notice of Completing Formalities for Patent Registration, CN Patent Application No. 202111569580.2, Jan. 10, 2023, nine pages.

*Primary Examiner* — Michael J Jansen, II
(74) *Attorney, Agent, or Firm* — Fenwick & West LLP

(57) ABSTRACT

A lower-power driving display device and a driving method. The driving method of the display device includes dividing the plurality of output buffers of the data driver into a plurality of output buffer groups, each of the plurality of output buffers being configured to apply the data voltage to each of the plurality of data lines connected with the display panel, and determining the magnitude of a bias current supplied to an output buffer on the basis of a pattern of a data voltage output by the output buffer which belongs to each of the plurality of divided output buffer groups.

18 Claims, 17 Drawing Sheets

(56) References Cited

U.S. PATENT DOCUMENTS

| | | | | |
|---|---|---|---|---|
| 6,670,941 B2* | 12/2003 | Albu | | G09G 3/3688 345/94 |
| 7,034,787 B2* | 4/2006 | Date | | H03F 3/08 345/589 |
| 7,317,440 B2* | 1/2008 | Chung | | G09G 3/3688 345/98 |
| 7,382,344 B2 | 6/2008 | Lee et al. | | |
| 7,728,810 B2* | 6/2010 | You | | G09G 3/3666 345/103 |
| 7,808,468 B2* | 10/2010 | Son | | H03K 17/165 345/98 |
| 8,736,373 B2* | 5/2014 | Chen | | H03F 3/45183 345/204 |
| 9,305,495 B2* | 4/2016 | Nakanishi | | G09G 3/3406 |
| 9,378,683 B2 | 6/2016 | Chae et al. | | |
| 9,552,786 B2* | 1/2017 | Shikata | | G09G 3/3607 |
| 9,721,511 B2* | 8/2017 | Jeong | | G09G 3/3688 |
| 9,818,367 B2* | 11/2017 | Lin | | G09G 3/3688 |
| 9,916,787 B2* | 3/2018 | Zheng | | G09G 3/32 |
| 10,354,602 B2* | 7/2019 | Hwang | | G09G 3/3688 |
| 10,424,239 B2* | 9/2019 | Aamold | | G09G 3/32 |
| 10,535,301 B2* | 1/2020 | Chae | | G09G 3/20 |
| 10,573,258 B2* | 2/2020 | Kim | | G09G 3/3677 |
| 10,614,749 B2* | 4/2020 | Kim | | G09G 3/3685 |
| 10,620,738 B2* | 4/2020 | Luo | | G06F 3/04164 |
| 10,878,760 B2 | 12/2020 | Kim et al. | | |
| 10,902,816 B2* | 1/2021 | Liu | | G09G 3/20 |
| 11,081,036 B1* | 8/2021 | Wang | | H03F 3/3022 |
| 11,270,652 B2* | 3/2022 | Lee | | G09G 3/3275 |
| 11,288,994 B2* | 3/2022 | Wang | | G09G 3/20 |
| 11,302,236 B2* | 4/2022 | Pyun | | G09G 3/2011 |
| 11,328,683 B2* | 5/2022 | Nagata | | G09G 3/3688 |
| 11,521,560 B2* | 12/2022 | Bae | | G09G 3/2011 |
| 11,551,601 B2* | 1/2023 | Ahn | | G09G 3/2007 |
| 11,615,732 B2* | 3/2023 | Kim | | G09G 3/3685 345/691 |
| 2003/0076285 A1* | 4/2003 | Albu | | H03F 3/72 345/87 |
| 2003/0085865 A1 | 5/2003 | Lee et al. | | |
| 2003/0184568 A1* | 10/2003 | Date | | H03F 3/08 345/690 |
| 2004/0036670 A1* | 2/2004 | Chung | | G09G 3/3688 345/99 |
| 2007/0008009 A1* | 1/2007 | Son | | H03K 17/165 326/87 |
| 2007/0120810 A1* | 5/2007 | You | | G09G 3/3666 345/103 |
| 2008/0278473 A1* | 11/2008 | An | | H03K 19/018585 327/108 |
| 2010/0164924 A1* | 7/2010 | Seo | | G09G 3/3696 345/98 |
| 2012/0249245 A1* | 10/2012 | Chen | | H03F 3/45183 330/261 |
| 2013/0314459 A1* | 11/2013 | Nakanishi | | G09G 3/3426 345/694 |
| 2015/0022429 A1 | 1/2015 | Chae et al. | | |
| 2015/0130851 A1* | 5/2015 | Jeong | | G09G 3/3688 345/82 |
| 2015/0279295 A1* | 10/2015 | Shikata | | G09G 3/3614 345/694 |
| 2015/0325200 A1* | 11/2015 | Rho | | G09G 3/3688 345/212 |
| 2016/0275850 A1* | 9/2016 | Zheng | | G09G 3/32 |
| 2016/0275897 A1* | 9/2016 | Lin | | G09G 3/3696 |
| 2016/0328075 A1* | 11/2016 | Luo | | G06F 3/04164 |
| 2018/0025689 A1* | 1/2018 | Aamold | | G09G 3/32 345/212 |
| 2018/0033381 A1* | 2/2018 | Hwang | | G09G 3/3677 |
| 2018/0090083 A1* | 3/2018 | Kim | | G09G 3/3666 |
| 2018/0158408 A1* | 6/2018 | Chae | | G09G 3/3233 |
| 2018/0286305 A1* | 10/2018 | Kim | | G09G 3/2074 |
| 2018/0293955 A1* | 10/2018 | Liu | | H03K 19/0175 |
| 2018/0308443 A1* | 10/2018 | Yamagishi | | G09G 3/3688 |
| 2019/0295474 A1 | 9/2019 | Kim et al. | | |
| 2020/0320918 A1 | 10/2020 | Choi et al. | | |
| 2021/0181828 A1* | 6/2021 | Chawla | | G05F 3/24 |
| 2021/0183320 A1* | 6/2021 | Lee | | G09G 3/3291 |
| 2021/0241711 A1* | 8/2021 | Nagata | | G09G 3/3688 |
| 2021/0295782 A1* | 9/2021 | Bae | | G09G 3/3688 |
| 2021/0398473 A1* | 12/2021 | Ahn | | G09G 3/2092 |
| 2022/0013052 A1* | 1/2022 | Wang | | G09G 3/20 |
| 2022/0051606 A1* | 2/2022 | Kim | | G09G 3/3275 |
| 2022/0084453 A1* | 3/2022 | Pyun | | G09G 3/2011 |
| 2022/0208123 A1* | 6/2022 | Kim | | G09G 3/3688 |

FOREIGN PATENT DOCUMENTS

| | | |
|---|---|---|
| KR | 10-2008-0048199 A | 6/2008 |
| KR | 10-2013-0027920 A | 3/2013 |
| KR | 10-2019-0110661 A | 10/2019 |
| TW | 201506883 A | 2/2015 |

\* cited by examiner

FIG. 9

| H6 | H5 | H4 | H3 | H2 | H1 |
|---|---|---|---|---|---|
| HGroup6 | HGroup5 | HGroup4 | HGroup3 | HGroup2 | HGroup1 |

(a)

| H6 | H5+C | H4+C | H3+C | H2+C | H1+C |
|---|---|---|---|---|---|
| HGroup6 | HGroup5 | HGroup4 | HGroup3 | HGroup2 | HGroup1 |

(b)

| H6 | H5−C | H4−C | H3−C | H2−C | H1−C |
|---|---|---|---|---|---|
| HGroup6 | HGroup5 | HGroup4 | HGroup3 | HGroup2 | HGroup1 |

(c)

LOW-POWER DRIVING DISPLAY DEVICE AND DRIVING METHOD OF SAME

CROSS REFERENCE TO RELATED APPLICATION

The present application claims priority to Korean Patent Application No. 10-2020-0184853, filed on Dec. 28, 2020, the entire contents of which is incorporated herein for all purposes by this reference.

BACKGROUND OF THE INVENTION

1. Field of the Invention

The present disclosure relates to a lower-power driving display device and a driving method of the same.

2. Description of the Related Art

As information society develops, various types of display devices are being developed. Recently, display devices using various technologies such as a liquid crystal display (LCD), a plasma display panel (PDP), and an organic light emitting display (OLED) are being commercialized.

As a display device is employed in a mobile product, operating the display device on a battery has become common. Accordingly, it is essential that the display device that operates on the basis of a battery operates with low power.

SUMMARY OF THE INVENTION

Accordingly, the present disclosure has been made keeping in mind the above problems occurring in the related art, and the present disclosure is intended to reduce the power consumption of a display device by proposing a method of controlling the bias current of an output buffer placed in a data driver, a method of reducing the power consumption of an output amplifier by setting a bias current corresponding to a slew rate required for each vertical position, and a method of reducing power consumption by setting a different touch drive signal voltage for each vertical position when driving a touch panel.

Technical objectives to be achieved in this document are not limited to the technical objectives mentioned above, and other technical objectives not mentioned will be clearly understood by those skilled in the art to which the present disclosure belongs through the description below.

In order to achieve the above objectives, according to various embodiments of the present disclosure, a display device includes: a display panel having a plurality of pixels disposed in a matrix form thereon; a timing controller configured to process an image signal and a control signal received from the outside and to generate data, a data drive control signal, and a gate drive control signal for outputting the image signal to the display panel; and a data driver including an output buffer configured to output a data voltage to each of a plurality of data lines of the display panel, wherein the plurality of data lines is divided into a plurality of data line groups, respectively, and the data driver supplies a bias current having a different magnitude for each of the data line groups to each of output buffers which drive data lines which belong to the plurality of data line groups, respectively.

According to various embodiments of the present disclosure, a driving method of the display device includes dividing the plurality of output buffers of the data driver into a plurality of output buffer groups, each of the plurality of output buffers being configured to apply the data voltage to each of the plurality of data lines connected with the display panel, and determining magnitude of a bias current supplied to an output buffer on the basis of a pattern of a data voltage output by the output buffer which belongs to each of the plurality of divided output buffer groups.

Various methods proposed in the present specification have an effect of reducing power consumed by the display device.

In addition, various methods proposed in the present specification have an effect of preventing heat generation due to the use of excessive current.

The effects obtainable in the present disclosure are not limited to the above-mentioned effects, and other effects not mentioned may be clearly understood by those skilled in the art to which the present disclosure belongs from the description below.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 9 illustrates examples of interpolation performance, in parts (a), (b), and (c);

In connection with the description of the drawings, the same or similar reference numerals may be used for the same or similar components.

DETAILED DESCRIPTION OF THE INVENTION

Figure 1:
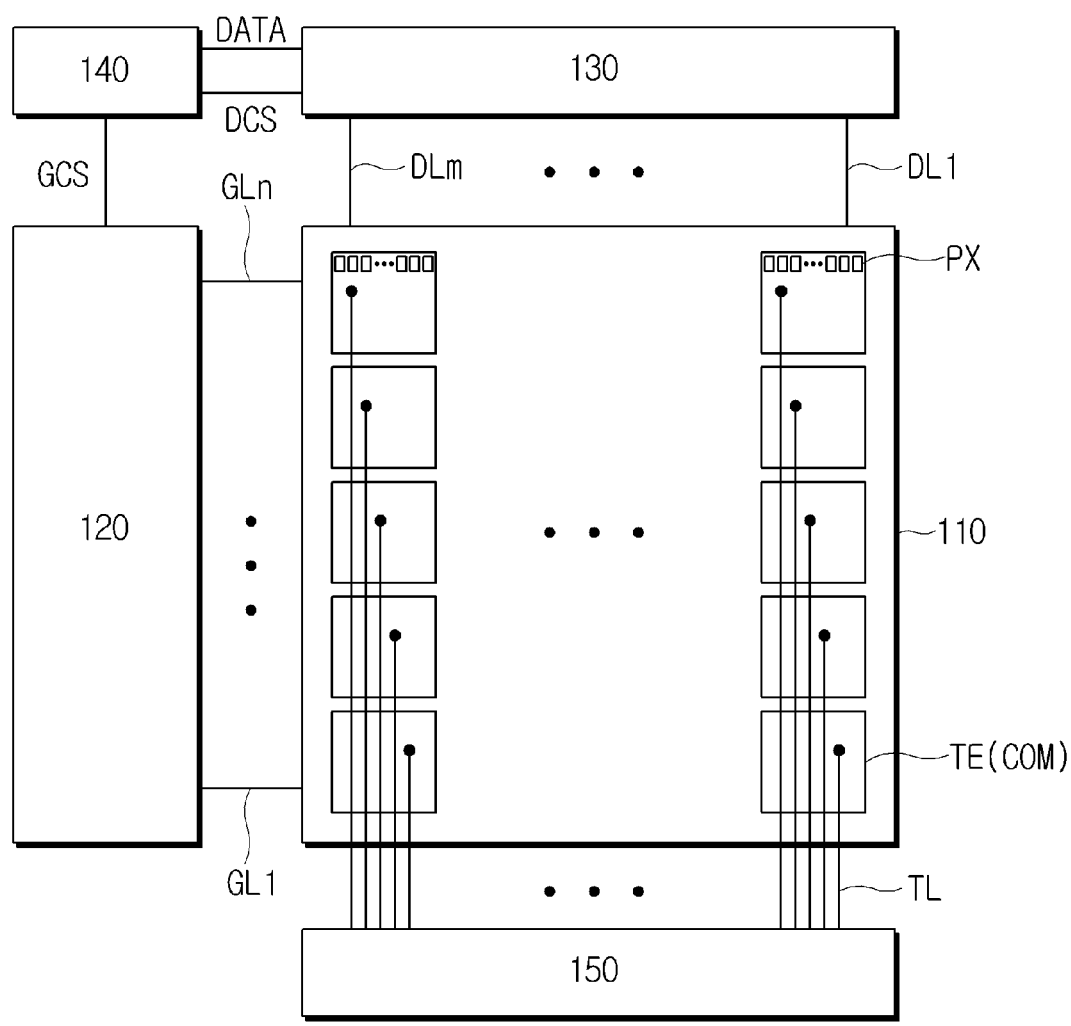
FIG. 1 is a view illustrating an approximate configuration of a display device according to an embodiment.

Throughout the specification, the same reference numerals refer to substantially identical components. In addition, in the drawings, the thicknesses, proportions, and dimensions of components may be exaggerated for effective description of technical content.

When a component (or an area, layer, or portion, etc.) is referred to as being "on", "connected to", or "coupled to" another component, it means that the component can be directly connected/coupled to other components or that a third component can be disposed therebetween. In addition, Terms such as "under", "at a lower side", "on", "at an upper side" are used to describe the relationship of the components shown in the drawings. The above terms have relative concepts and are described with reference to directions indicated in the drawings. Terms such as "comprise" or "have" are intended to designate that a feature, number, step, operation, component, or combination thereof described in the specification is present, and it should be understood that the terms do not preclude the possibility of addition or existence of one or more other features or numbers, steps, operations, components, or combinations thereof.

Terms such as first and second, etc. may be used to describe various elements, but the elements are not limited to the terms. The above terms are used only for the purpose of distinguishing one component from another component. For example, without departing from the scope of the present disclosure, the first component may be referred to as the second component. Similarly, the second component may also be referred to as the first component. A singular expression includes a plural expression unless the context clearly dictates otherwise.

In the following description, when it is determined that a detailed description of a known technology or configuration related to the present disclosure may unnecessarily obscure the gist of the present disclosure, a detailed description thereof will be omitted. In addition, the names of components used in the following description may be selected in consideration of the ease of writing the specification, and may be different from the names of components of an actual product.

Hereinafter, various embodiments will be described in detail with reference to the accompanying drawings.

FIG. 1 is a view illustrating an approximate configuration of a display device according to the embodiment.

Referring to FIG. 1, the display device 100 according to the embodiment may include: a display panel 110, a gate driver 120, a data driver 130, a timing controller 140, and a touch driver 150.

A plurality of pixels PX are disposed on the display panel 110. The pixels PX may be formed at intersections of gate lines GL1 to GLn and the data lines DL1 to DLm. For example, the pixels PX may be disposed in a matrix form on a touch integrated display panel 110.

Each of the pixels PX may be connected to the gate lines GL1 to GLn and the data lines DL1 to DLm corresponding to the pixels PX. These pixels PX may emit light with luminance corresponding to data signals supplied to the data lines DL1 to DLm in synchronization with the supplying timing of gate signals supplied to the gate lines GL1 to GLn.

Depending on the type of the display device 100, pixels PX may include a liquid crystal element or a light emitting element. For example, when the display device 100 is a liquid crystal display, the display device 100 may include a light source (for example, a backlight unit) emitting light to the display panel 110, and the pixels PX may include a pixel electrode, a common electrode COM, and a liquid crystal. When an electric field is formed between the pixel electrode and the common electrode COM in response to a data voltage applied to pixels PX, the arrangement of the liquid crystal is adjusted. Accordingly, the transmittance of light emitted from the light source is adjusted, so that each of the pixels PX may emit light with luminance corresponding to a data signal.

Alternatively, for example, when the display device 100 is an organic light emitting display, the pixels PX may include an organic light emitting diode. In this case, each of the pixels PX may emit light with luminance corresponding to a data signal by controlling a driving current flowing to the organic light emitting diode according to the voltage of the data signal.

In the present embodiment, the display panel 110 may be embodied as a touch integrated display panel capable of detecting a touch input. To this end, the display panel 110 may include a plurality of touch electrodes.

Each of the touch electrodes TE may be disposed outside a pixel PX or may be embedded in a pixel cell. The touch electrode TE may be an electrode separately disposed for touch detection or an electrode used for display driving. That is, any one of electrodes of a pixel PX disposed for display driving may be used as the touch electrode TE.

For example, when the display device 100 is a liquid crystal display, the touch electrode TE may be a common electrode COM that is embedded in the display panel 110 and receives a common voltage Vcom during display driving. Alternatively, when the display device 100 is an organic light emitting display, the touch electrode TE may be an electrode (for example, a cathode electrode) of the organic light emitting diode. However, the touch electrode TE is not limited thereto, and may use any one of electrodes of a pixel PX.

Since an electrode used for display driving also functions as the touch electrode TE, the display driving and touch driving may be temporally distinguished from each other.

Hereinafter, embodiments in which the display device 100 is embodied as the liquid crystal display will be described. However, the embodiments are not limited thereto.

In the embodiment, the touch electrode TE may be configured to have a size corresponding to j pixels PX grouped in blocks. The touch electrode TE may be embodied by dividing and patterning the common electrode COM such that the common electrode COM has a size corresponding to j pixels PX. However, the present disclosure is not limited thereto.

Each of the touch electrodes TE may be connected with the touch driver 150 through a touch line TL and may detect an external touch input in response to a touch drive signal voltage received from the touch driver 150.

The gate driver 120, the data driver 130, and the timing controller 140 constitute a display drive part of the display device 100.

The gate driver 120 is connected with the pixels PX of the display panel 110 through the gate lines GL1 to GLn. The gate driver 120 generates gate signals on the basis of a gate drive control signal GCS output from the timing controller 140. The gate driver 120 supplies the generated gate signals to the pixels PX through the gate lines GL1 to GLn.

The data driver 130 is connected with the pixels PX of the display panel 110 through the data lines DL1 to DLm. The data driver 130 generates data signals on the basis of image data DATA and a data drive control signal DCS output from the timing controller 140. The data driver 130 supplies the generated data signals to the pixels PX through the data lines DL1 to DLm.

The timing controller 140 may process an image signal and a control signal (for example, a horizontal sync signal, a vertical sync signal, and a main clock signal, etc.) received from the outside such that the image signal and control signal are suitable for the operating condition of the display panel 110, and may generate and output the image data DATA, the gate drive control signal GCS, and the data drive control signal DCS.

The touch driver 150 is connected with the touch electrodes TE through the touch lines TL. The touch driver 150 outputs the touch drive signal voltage to each of the touch electrodes TE and detects a touch input by receiving the touch sensing signal from the touch electrode TE. In the embodiment, the display panel 110 may be configured to detect a touch input in a self-capacitance method. In such an embodiment, the touch driver 150 may detect a touch input through a change in capacitance identified from the touch sensing signal. In another embodiment, the display panel 110 may be configured to detect a touch input in a mutual capacitance method. In such an embodiment, the touch driver 150 may detect the touch input by detecting a changed amount in capacitance formed between two electrodes. However, the present disclosure is not limited to this embodiment, and other types of touch sensing methods are also included in the spirit of the present disclosure.

The gate driver 120, the data driver 130, the timing controller 140, and the touch driver 150 may be configured as separate integrated circuits (IC), respectively, or may be configured as integrated circuits, at least some of which are integrated with each other. For example, the data driver 130 may be configured as an integrated circuit integrated with the timing controller 140 and/or the touch driver 150.

In addition, in FIG. 1, the gate driver 120 and the data driver 130 are illustrated as separate components from the display panel 110, but at least one of the gate driver 120 and the data driver 130 may be configured to be integrated with the display panel 110 according to an in panel method. For example, the gate driver 120 may be configured to be integrated with the display panel 110 according to a gate in panel (GIP) method.

Figure 2:
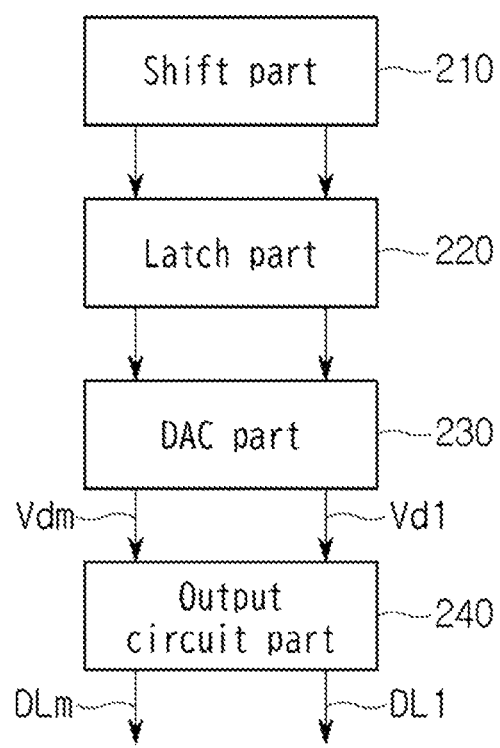
FIG. 2 is a view illustrating an approximate configuration of a data driver.

FIG. 2 is a view illustrating the approximate configuration of the data driver 130.

Referring to FIG. 2, the data driver 130 may include a shift part 210, a latch part 220, a DAC (digital-to-analog converter) part 230, and an output circuit part 240.

The shift part 210 may shift a sampling signal according to a data sampling clock.

The latch part 220 samples the image data DATA input from the timing controller 140 in response to sampling signals sequentially input from the shift part 210, and latches the data for each horizontal line, and may simultaneously output the data of each horizontal line.

The DAC part 230 may decode data input from the latch part 220 and output the positive/negative gamma compensation voltages (VGH) corresponding to the grayscale values of the data as the data voltages Vd1 to Vdm.

The output circuit part 240 may output the data voltages Vd1 to Vdm to the data lines DL1 to DLm, respectively.

Figure 3:
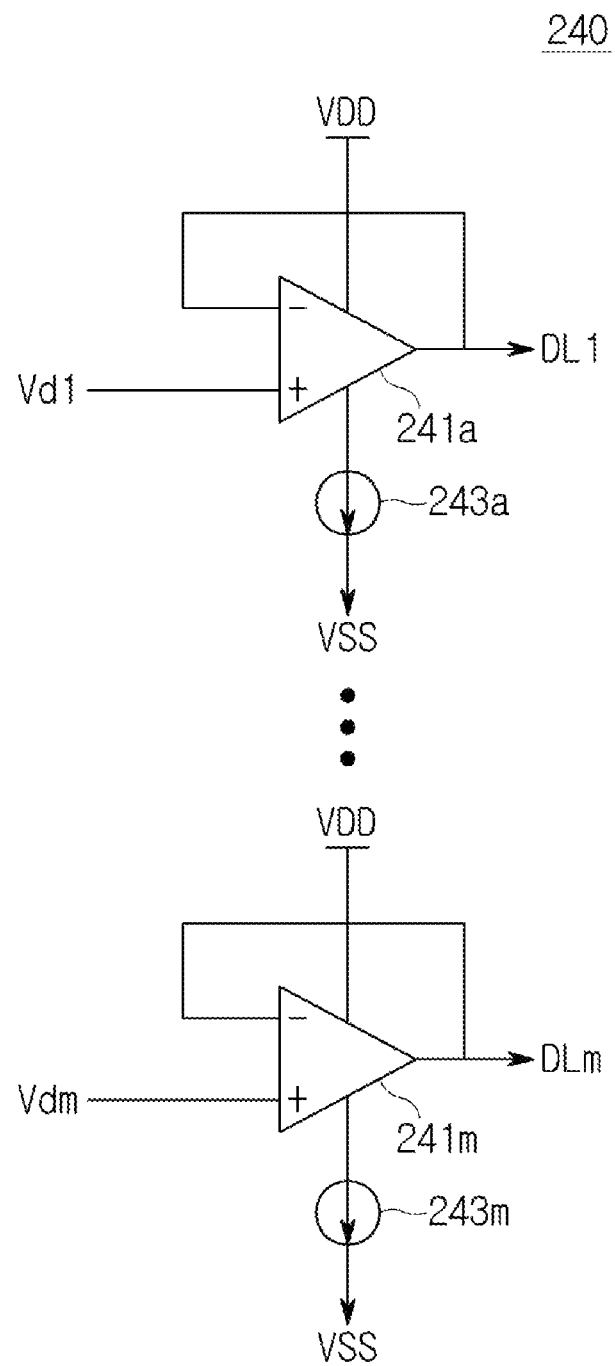
FIG. 3 is a view illustrating an approximate configuration of an output circuit part.

FIG. 3 is a view illustrating the approximate configuration of the output circuit part 240.

Referring to FIG. 3, the output circuit part 240 includes the plurality of output buffers 241a to 241m. The plurality of output buffers 241a to 241m receive analog data voltages Vd1 to Vdm, respectively, from the DAC part 230 and may output the analog data voltages Vd1 to Vdm to the data lines DL1 to DLm, respectively, of the display panel 110.

Each of the output buffers 241a to 241m may be an operational amplifier. The operational amplifier is supplied with a source voltage (VDD), and each of bias parts 243a to 243m which supply bias currents may be provided between the operational amplifier and a ground voltage terminal (VSS).

Figure 4:
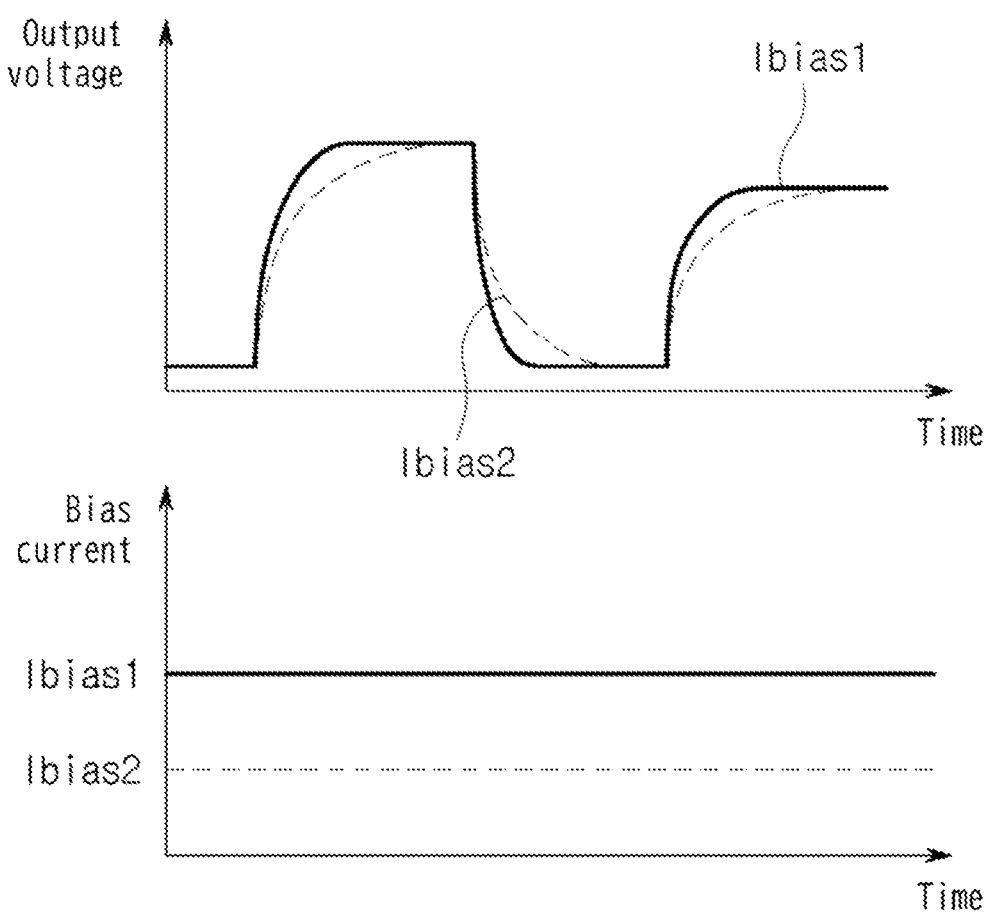
FIG. 4 illustrates the graphs of the characteristics of a bias current and an output voltage supplied to each of the output buffers.

FIG. 4 illustrates the graphs of the characteristics of a bias current and an output voltage supplied to each of the output buffers 241a to 241m.

Referring to FIG. 4, the output voltage (a data voltage) output from each of the output buffers 241a to 241m may have an output characteristic that varies according to a bias current supplied to the output buffer. As illustrated in FIG. 4, as for the characteristics of the output voltages when the first bias current Ibias1 and the second bias current Ibias2 as bias currents are supplied to the output buffers, respectively, it can be seen that when the first bias current Ibias1 having a relatively large current value is supplied to the output buffer, the output voltage output from the output buffer is output without delay. On the other hand, it can be seen that when the second bias current Ibias2 smaller than the first bias current Ibias1 is supplied to the output buffer, the output voltage output from the output buffer is relatively more delayed in a rising section and a falling section.

Figure 5:
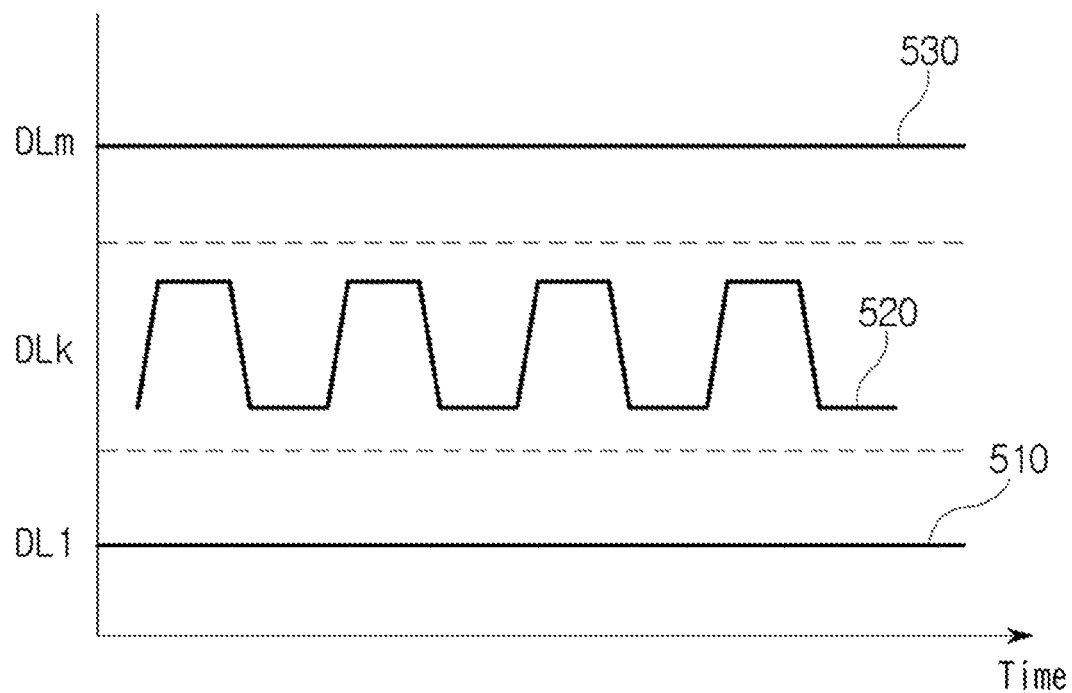
FIG. 5 is a graph illustrating an example of waveforms output to data lines.

FIG. 5 is a graph illustrating an example of waveforms output to data lines DL1 to DLm.

According to the embodiment, as illustrated in FIG. 5, when portions DL1 and DLm of the data lines are required to constantly output constant values 510 and 530, respectively, and another portion DLk of the data lines is required to output a value 520 of a toggle waveform, an output buffer which outputs the value of the toggle waveform is required to receive a high bias current (e.g., Ibias2) so as to output the value of a toggle waveform having as little delay as possible, whereas an output buffer which is required to constantly output a constant value may be sufficient to receive only a low bias current (e.g., Ibias1). However, when the same bias current is required to be supplied to each of the entire output buffers 241a to 241m of the data driver, a high bias current is required to be supplied thereto so as to output the toggle waveform without delay. In this case, the output buffer that is sufficient even with a low bias current may unnecessarily consume a lot of power.

According to the present disclosure, in order to prevent such power consumption, the data lines DL1 to DLm (or the output buffers 241a to 241m connected with the data lines) are divided into a plurality of data line groups, and a bias current is set according to an output pattern of each of the groups. In this case, a bias block which can control and supply the amount of a bias current supply for each of the groups may be provided. Accordingly, when the number of constituting groups is large, the number of bias blocks also increases, so the size of a chip (e.g., a driver IC) increases. However, since the size of the chip cannot be increased indefinitely, the appropriate number of groups may be set in consideration of a current consumption reduction effect and the size of the chip.

Figure 6:
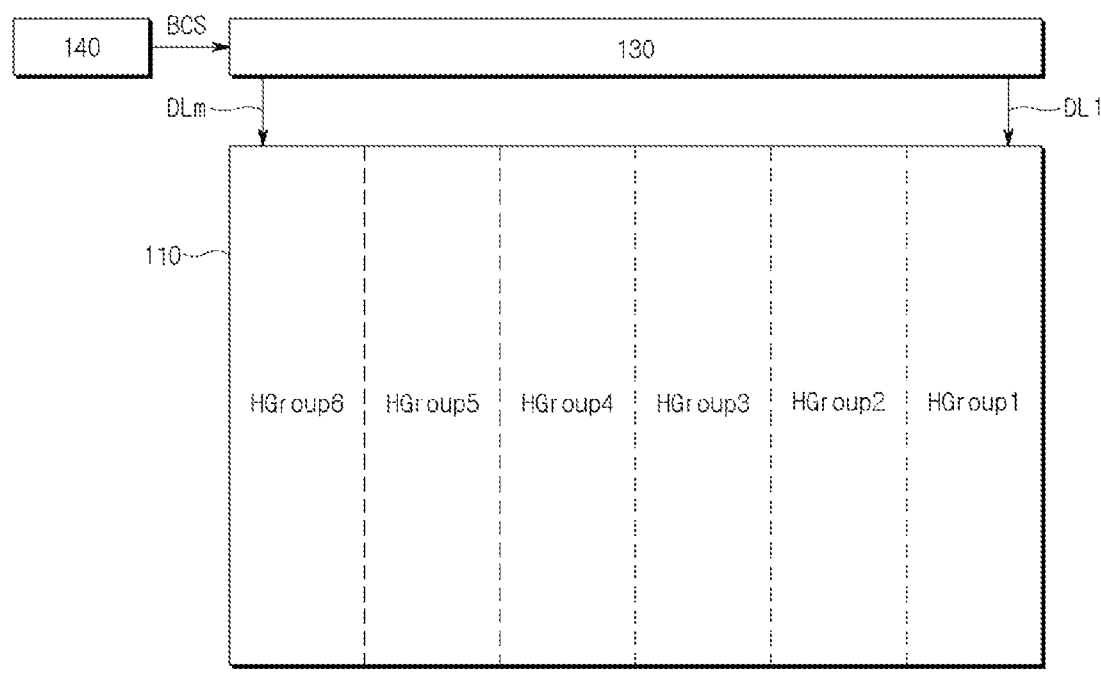
FIG. 6 is a view illustrating an example of dividing the data lines into a plurality of data line groups.

FIG. 6 is a view illustrating an example of dividing the data lines DL1 to DLm into a plurality of data line groups.

Referring to FIG. 6, the data lines DL1 to DLm may be divided into 6 data line groups (HGroup1 to HGroup6), respectively. This may correspond to the division of the output buffers 241a to 241m of the data driver 130 into 6 output buffer groups, respectively. A bias part which supplies a bias current to each of the data line groups may be provided in an output buffer which belongs to each of the output buffer groups.

Figure 7:
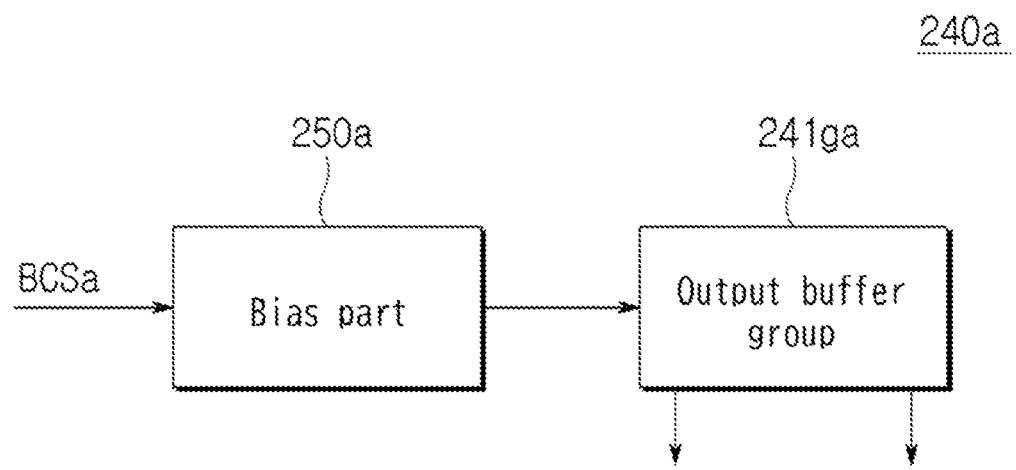
FIG. 7 is a view illustrating an example of an output circuit part for one data line group.

FIG. 7 is a view illustrating an example of an output circuit part for one data line group. Here, HGroupa may be any one of HGroup1 to HGroup6.

Referring to FIG. 7, the output circuit part 240a for one data line group may be provided with a bias part 250a which can supply a bias current controlled for an output buffer group 241ga. Furthermore, on the basis of a bias control signal BCSa received from the timing controller 140, the bias part 250a may control the magnitude of a current to be supplied.

The timing controller 140 may recognize a group of a toggle waveform by performing the recognition of a pattern on data (DATA) to be output to a data line belonging to each group. For example, among 6 groups illustrated in FIG. 6, a toggle waveform may be recognized to be present in at least one of data lines which belong to a third group HGroup3 and a fifth group HGroup5, respectively.

In this case, the timing controller 140 may transmit a bias control signal BCS as a recognized result to the bias part 250. According to the embodiment, when the data lines (or the output buffers) are divided into 6 groups, bias control signals BCS may be composed of a total of 6 bits, 1 bit corresponding to each group. Furthermore, the timing controller 140 may set a bit of each of the bias control signals BCS and transmit the bias control signal BCS to the bias part 250. Here, the bits may be associated with the groups, respectively. For example, a bit corresponding to a group in which a toggle waveform exists may be set as logic "H" or "1", and a bit corresponding to a group in which a toggle waveform does not exist may be set as logic "L" or "0". For example, when a toggle waveform exists in at least one of data lines which belong to the third group HGroup3 and the fifth group HGroup5, the bias control signal BCS may be "LLHLHL". The timing controller 140 may transmit such a bias control signal BCS to the bias part 250.

The bias part 250 may be set to supply a maximum bias current to a group corresponding to a bit set as logic "H". In the example described above, the bias part 250 may be set to supply the maximum bias current to HGroup3 and HGroup5. According to the embodiment, the magnitude of a bias current to be supplied to each group may be set as a 5-bit parameter PWRC. For example, the parameter PWRC of each of HGroup3 and HGroup5 to which maximum bias currents are supplied may be "HLLLL" (16 in decimal, and 10000 in binary).

In addition, the bias part 250 may cause the value of the parameter PWRC to decrease by a preset step parameter H_PWRC_Step as one group moves away from a group to which logic "H" is input. According to the embodiment, when the step parameter H_PWRC_Step is set to be 4, as in the example described above, the bias part 250 may set the parameter PWRC of each of HGroup3 and HGroup5 as "HLLLL", and the parameter PWRC of each of HGroup2, HGroup4, and HGroup6 which are groups directly next thereto may be set as "LHHLL" (12 in decimal, and 01100 in binary") by subtracting the step parameter H_PWRC_Step (e.g., 4) from the parameter PWRC of each of HGroup3 and HGroup5. In addition, the bias part 250 may set a group HGroup1 crossing one group from each of HGroup3 and HGroup5 as "LHLLL" as the parameter PWRC of the associated group by subtracting the step parameter H_PWRC_Step (e.g., 4) therefrom. A bias current corresponding to the parameter PWRC set for each group may be supplied to the group.

Figure 8:
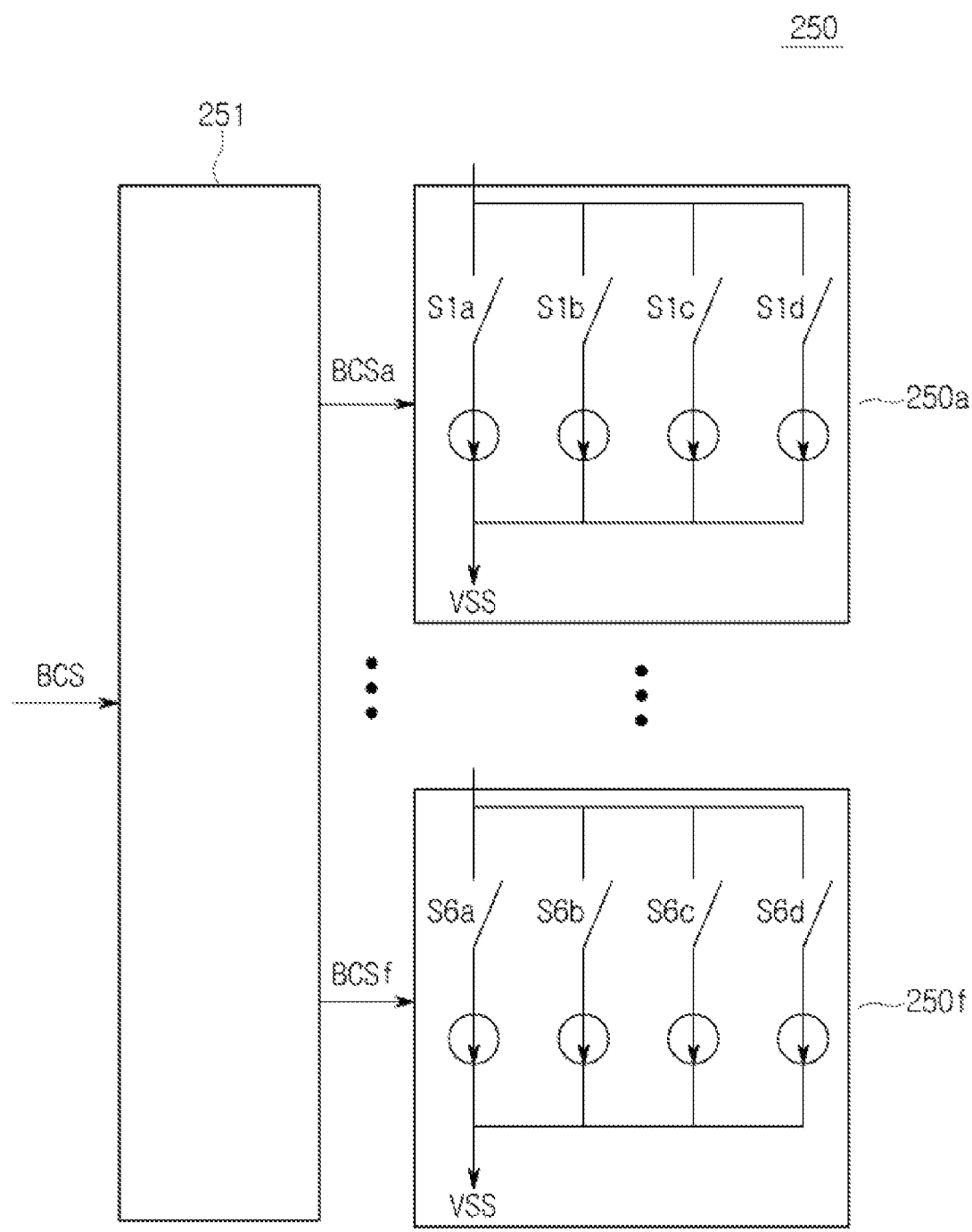
FIG. 8 is a view illustrating an approximate configuration of a bias part.

FIG. 8 is a view illustrating the approximate configuration of the bias part.

Referring to FIG. 8, the bias part 250 may include group bias parts 250a to 250f which supply bias currents to groups, respectively, and a bias current setting part 251. The bias current setting part 251 may generate bias control signals BCSa to BCSf which control switches (S1a to S1d, and S6a to S6d) of the group bias parts 250a to 250f on the basis of the bias control signal BCS received from the timing controller 140. According to the embodiment, the function of the bias current setting part 251 may be performed in the timing controller 140, and the bias control signal BCS may be embodied to include the bias control signals BCSa to BCSf for each group.

In FIG. 8, each constant current source may be embodied to supply a constant current of 4 μA.

Referring to the example described above, each of bias control signals BCSc and BCSe for HGroup3 and HGroup5, respectively, required to supply the maximum bias currents may be "HHHH" such that all switches are closed and all constant current sources are connected to output buffers, respectively. Furthermore, for example, each of the bias control signals BCSb, BCSd, and BCSf for HGroup2, HGroup4, and HGroup6, respectively, may be "HHLH" such that one switch is opened and three switches are closed and only three constant current sources of four constant current sources supply constant currents. Furthermore, for example, a bias control signal BCSa for HGroup1 may be "LLHH" such that two switches are opened and two switches are closed and only two constant current sources of four constant current sources supply constant currents.

By configuring the bias part 250 as illustrated in FIG. 8, it may be possible to supply a different bias current for each group. In the example of FIG. 8, the same four constant current sources are illustrated to be used, but this is only one embodiment, and it is possible to configure constant current sources in other manners.

As described above, when using the method proposed in the present disclosure in which the output buffers of the data driver are divided into a plurality of groups and a different bias current is supplied to each of the groups, power consumption used in the display device can be reduced.

Meanwhile, as described above, in the case in which the output buffers are divided into the plurality of groups, different bias currents may be continuously supplied to the groups, respectively, so a visibility defect may occur at a boundary between each of the groups. In order to solve this problem, in the present disclosure, interpolation may be performed at the boundary between each of the groups.

According to the various embodiments, the display device may be provided with a parameter H_INTP_EN indicating whether to perform interpolation at a boundary of each group. In addition, the display device may be provided with a parameter H_INTP_Ch which sets the number of channels to perform the interpolation, that is, the number of data lines. According to the embodiment, the parameter H_INTP_EN may be a 1-bit parameter, and when the parameter H_INT- P_EN is logic 'H' or '1', it may indicate that interpolation is performed, and when the parameter H_INTP_EN is logic 'L' or '0', it may indicate that interpolation is not performed. In addition, the parameter H_INTP_Ch may also be 1-bit parameter, and when the parameter H_INTP_Ch is logic 'H' or '1', it may indicate 24 channels, and when the parameter H_INTP_Ch is logic 'L' or '0', it may indicate 12 channels. These settings are merely one embodiment and may be variously changed as needed.

FIG. 9 illustrates examples of interpolation performance in parts (a), (b), (c).

As illustrated in FIG. 9, part (a), when the parameter H_INTP_EN is set not to perform interpolation, the magnitude of a bias current for each group may be controlled while each of the groups HGroup1 to HGroup6 is maintained.

Meanwhile, according to the embodiment, when the parameter H_INTP_EN is set to perform interpolation, each group in an odd-numbered frame is configured by moving leftward from a boundary of each group illustrated in FIG. 9, part (a) as many as the number of channels C set by the parameter H_INTP_Ch, and each group in an even-numbered frame is configured by moving rightward from a boundary of each group illustrated in FIG. 9, part (a) as many as the number of channels C set by the parameter H_INTP_Ch. In this case, each of the first group and the last group may be smaller or larger than an initial size thereof.

For example, as illustrated in FIG. 9, part (a), when the parameter H_INTP_EN is set not to perform interpolation, HGroup1 may be configured as a group composed of a data line between 1 and H1 (or an output buffer which outputs a data voltage to the data line), and HGroup2 to HGroup6 may be configured as groups composed of data lines between H1+1 and H2, between H2+1 and H3, between H3+1 and H4, between H4+1 and H5, and between H5+1 and H6, respectively.

Furthermore, as illustrated in FIG. 9, part (b), when the parameter H_INTP_EN is set to perform interpolation, in the case of the odd-numbered frame, HGroup1 to HGroup6 may be configured as groups composed of data lines between 1 and H1+C, between H1+C+1 and H2+C, between H2+C+1 and H3+C, between H3+C+1 and H4+C, between H4+C+1 and H5+C, and between H5+C+1 and H6, respectively. Accordingly, the number of data lines included in HGroup1 may increase, and the number of data lines included in HGroup6 may decrease.

In addition, as illustrated in FIG. 9, part (c), in the case of the even-numbered frame, HGroup1 to HGroup6 may be configured as groups composed of data lines between 1 and H1-C, between H1-C+1 and H2-C, between H2-C+1 and H3-C, between H3-C+1 and H4-C, between H4-C+1 and H5-C, and between H5-C+1 and H6, respectively. Accordingly, the number of data lines included in HGroup1 may decrease, and the number of data lines included in HGroup6 may increase.

Accordingly, a portion of a data line located at a boundary between each group may belong to a different group of each frame, and thus the magnitude of an applicable bias current may be changed. Accordingly, in the case of no interpolation, differences between the magnitudes of bias currents at boundaries between groups are clear. But in the case of interpolation, differences between the magnitudes of bias currents at boundaries between groups are unclear, and thus visibility detect at the boundaries between the groups may be prevented.

In the example of FIG. 9, interpolation is illustrated to be performed at all boundaries, but according to the embodiment, interpolation may not be performed at all boundaries. For example, in a case in which both HGroup3 and HGroup4 have toggle patterns and are set to use the maximum bias currents, interpolation may not be performed at a boundary between HGroup3 and HGroup4. Interpolation for a boundary part may be performed only at a boundary between HGroup1 and HGroup2, at a boundary between HGroup2 and HGroup3, at a boundary between HGroup4 and HGroup5, and at a boundary between HGroup5 and HGroup6.

Figure 10:
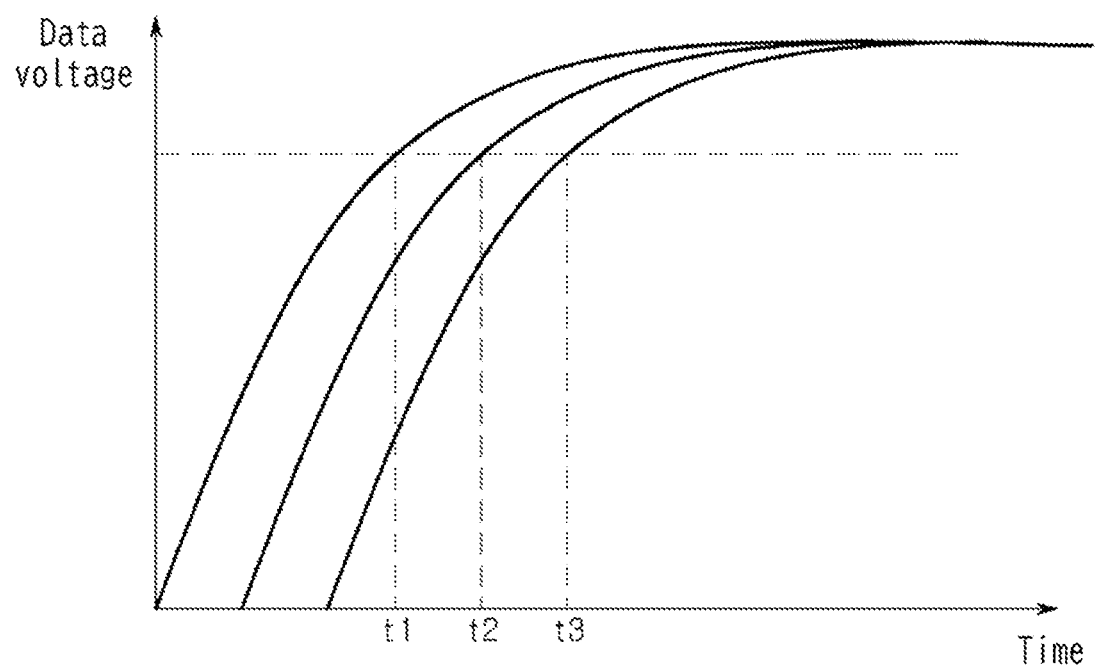
FIG. 10 is a graph illustrating a waveform of the data voltage of a pixel according to a distance between the pixel connected to each of the data lines and the data driver.

FIG. 10 is a graph illustrating a waveform of the data voltage of a pixel according to a distance between the output buffer of the data driver 130 and the pixel PX connected to the data line.

Each pixel may be recognized as "H" only when the data voltage input to the pixel reaches a predetermined settled value. However, in a case in which all pixels in one column are connected to each other by one data line, a delay time which the data voltage takes to reach a pixel located at a position close to the data driver 130 is short, and a delay time which the data voltage takes to reach a pixel located at a position far from the data driver 130 is long, so as illustrated in FIG. 10, the settling times t1, t2, and t3 of the data voltages may be different from each other. In this case, when the settling time t3 of a data voltage at a pixel located at a farthest position from the data driver 130 is within a required time, the settling times t1 and t2 of data voltages at pixels located at positions more inner than the farthest position are shorter.

When a bias current applied to an output buffer outputting a data voltage is small, a slew rate also decreases, so time which the data voltage takes to move up from "L" to "H" may increase, and time which the data voltage takes to be settled may increase. Accordingly, when the destination of the data voltage is a pixel close to the data driver 130, the data voltage of the output buffer may be sufficiently settled even with a lower bias current within a required time. Accordingly, pixels connected to one data line are divided into a plurality of pixel groups on the basis of a distance between the pixels and the data driver 130, and a relatively low bias current may be used and output to a pixel group close to the data driver 130. Accordingly, power consumption can be reduced. According to the embodiment, a method of reducing the most amount of power consumption is to separately set groups with only pixels connected to each data line and set a different bias current for each of the groups. However, this may not be preferable in that a lot of constant current sources are required to be arranged in terms of generating the bias current.

Figure 11:
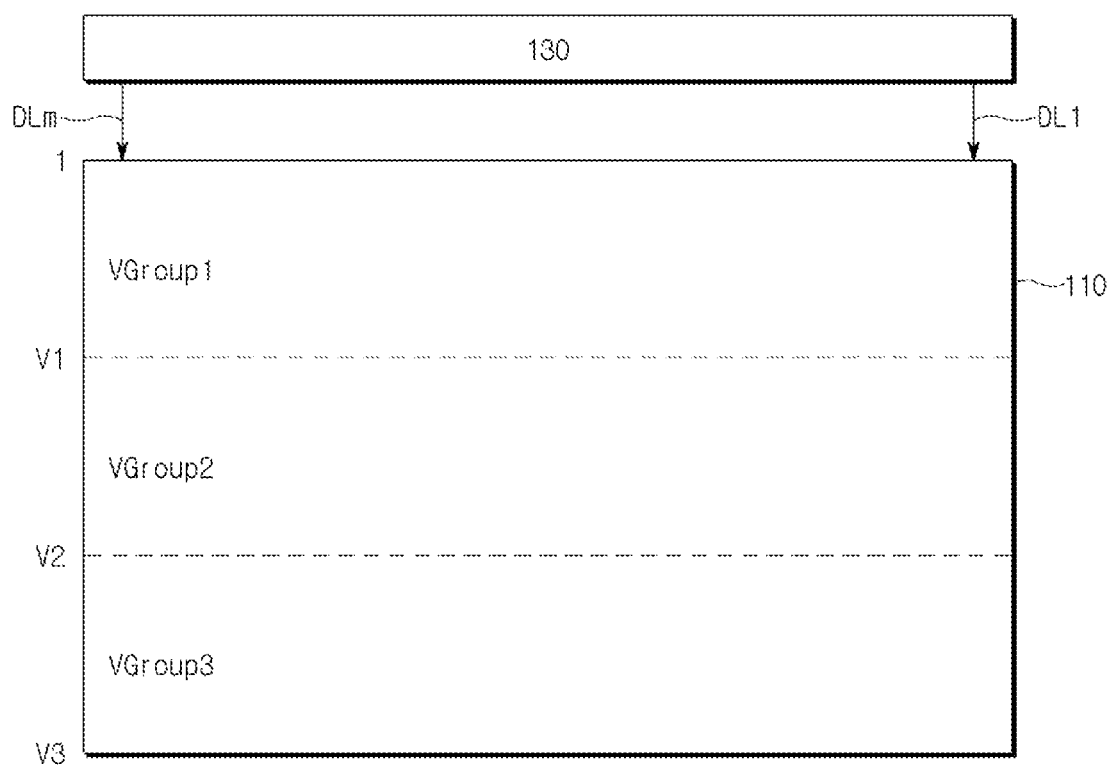
FIG. 11 is a view illustrating an example of supplying a gate signal by using a different gate line for each of pixel groups by dividing pixels which belong to each row into the plurality of pixel groups.

FIG. 11 is a view illustrating an example of dividing pixels connected to one data line into a plurality of pixel groups.

In the example of FIG. 11, pixels connected to one data line are divided into 3 pixel groups, a first vertical group VGroup1 may be configured as a group composed of pixels connected to the data line between a gate line 1 and a gate line V1, a second vertical group VGroup2 may be configured as a group composed of pixels connected to the data line between a gate line V1+1 and a gate line V2, and a third vertical group VGroup3 may be configured as a group composed of pixels connected to the data line between a gate line V2+1 and a gate line V3.

Figure 12:
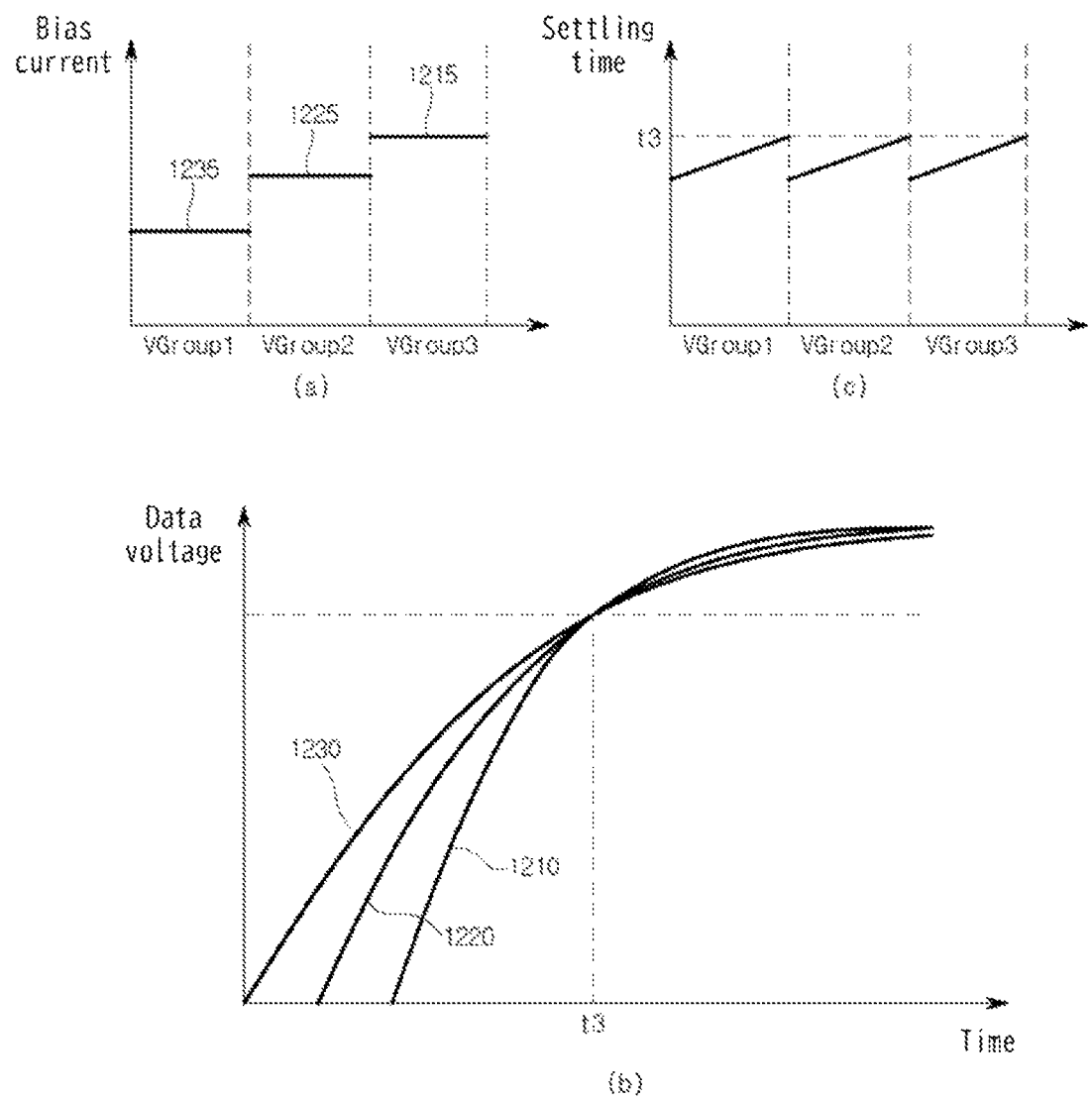
FIG. 12 shows graphs illustrating a bias current supplied to an output buffer which outputs a data voltage to a pixel which belongs to each of three groups of FIG. 11, the waveform of the data voltage according to the bias current, and a settling time according to the bias current in parts (a), (b) and (c), respectively.

FIG. 12 shows graphs illustrating a bias current supplied to an output buffer which outputs a data voltage to a pixel which belongs to each of three groups of FIG. 11, the waveform of the data voltage according to the bias current, and a settling time according to the bias current in parts (a), (b), and (c), respectively.

Referring to FIG. 12, part (a), when a data voltage is supplied to the first vertical group VGroup1 which is a group of pixels close to the data driver 130, a low bias current 1235 may be supplied to the output buffer, and when a data voltage is supplied to the third vertical group VGroup3 which is a group of pixels far from the data driver 130, a high bias current 1215 may be supplied to the output buffer.

As illustrated in FIG. 12, part (b), when the low bias current 1235 is supplied, the slew rate of the data voltage 1230 may be decreased, and as a result, a data voltage input to the last pixel of the first vertical group VGroup1 may be settled at t3. On the other hand, when the high bias current 1215 is supplied, the slew rate of the data voltage 1210 may be increased, and as a result, although the supply of the data voltage to pixels located at a position far from the data driver 130 is delayed, a data voltage input to the last pixel of the third vertical group VGroup3 may also be settled at t3. Similarly, by adjusting the magnitude of a bias current, a data voltage input to the last pixel of the second vertical group VGroup2 may be settled at t3.

In this case, as illustrated in FIG. 12, part (c), the settling time of a data voltage reaching each of all pixels may be shorter than t3.

Accordingly, the settling time of the data voltage reaching each of all pixels may be shorter than t3 and the magnitude of the bias current may be reduced, so power consumption may be reduced.

However, as illustrated in FIG. 12, part (c), in one group, the settling time of the data voltage reaching a pixel located at a position close to the data driver 130 is shorter than the settling time of the data voltage reaching a pixel located at a position far from the data driver 130. Accordingly, at a boundary between two groups, the settling time of the last pixel of one group and the settling time of the first pixel of the next group are significantly different from each other, so visibility at the boundary between the two groups may be decreased.

In order to reduce the occurrence of such a visibility defect, an interpolation method may be used.

Figure 13:
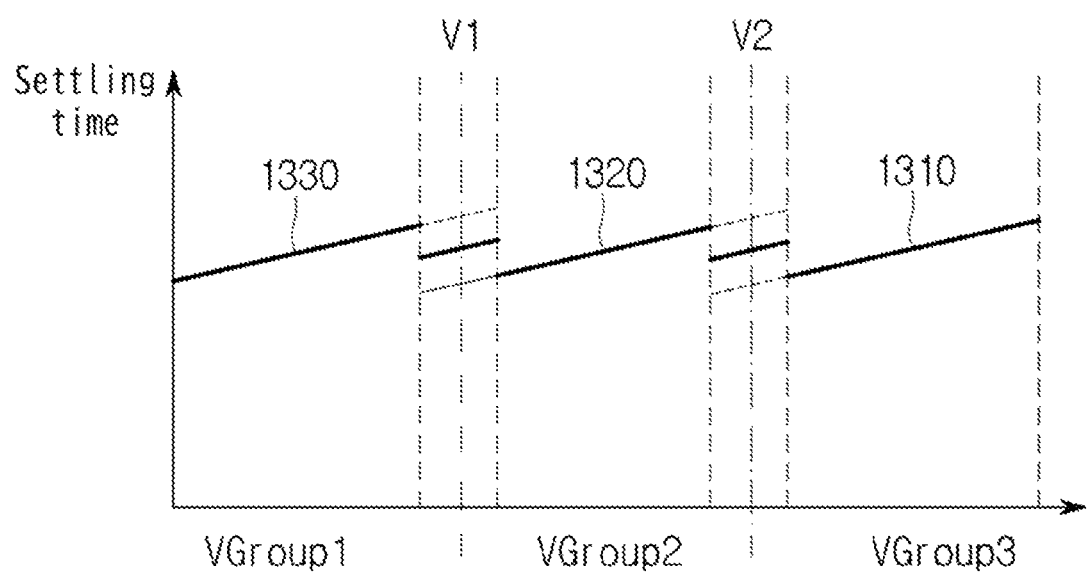
FIG. 13 is a graph illustrating a preset interpolation area and a settling time in the interpolation area.

FIG. 13 is a graph illustrating a preset interpolation area and a settling time in the interpolation area.

Referring to FIG. 13, an interpolation area is set at each of the opposite sides of a boundary surface V1 or V2, and an average value of the existing settling times is applied to the interpolation area, so difference between the settling times can be reduced at a boundary between two groups.

For such an interpolation, a parameter V_INTP_EN, a parameter V_INTP_Line, and a parameter V_INTP_Type may be set. According to the embodiment, the parameter V_INTP_EN as a 1-bit parameter may set whether to perform an interpolation, and the parameter V_INTP_Line as 6-bit parameter may set the number (an area) of data lines to which an interpolation is applied. The parameter V_INTP_Type is a parameter which sets an interpolation method and, according to the embodiment, may indicate a "single" method when logic is "0", and may indicate a "dual" method when logic is "1".

Figure 14:
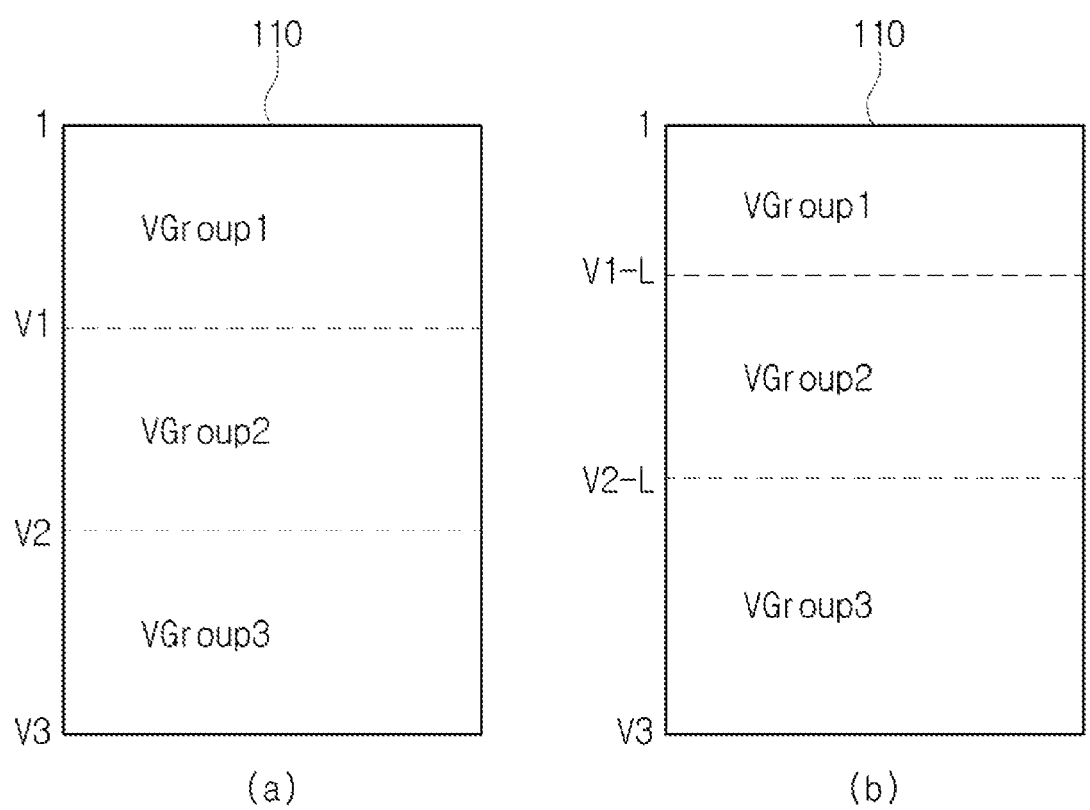
FIG. 14 shows views illustrating an interpolation method according to a "single" method in parts (a) and (b)

FIG. 14 show views illustrating an interpolation method according to the "single" method in parts (a) and (b).

The parameter V_INTP_EN is set to perform an interpolation, and when the single method is set by the parameter V_INTP_Type, two consecutive frames may be set as one pair of frames. Furthermore, as for the odd-numbered frame, an initial group setting is maintained, and for the realization of the settling times illustrated in FIG. 12, part (c), bias currents may be supplied to the output buffers of the data driver 130. Referring to FIG. 14, part (a), in the odd-numbered frame, the first vertical group VGroup1 may be configured as a group composed of pixels connected to a data line between the gate line 1 and the gate line V1, the second vertical group VGroup2 may be configured as a group composed of pixels connected to the data line between the gate line V1+1 and the gate line V2, and the third vertical group VGroup3 may be configured as a group composed of pixels connected to the data line between the gate line V2+1 and the gate line V3.

As for the even-numbered frame, a new group may be set by moving an initial group upward (to a position close to the data driver 130) from a preset position of the initial group as many as the number L of data lines set by the parameter V_INTP_Line. Referring to FIG. 14, part (b), the first vertical group VGroup1 may be configured as a group composed of pixels connected to a data line between a gate line 1 and a gate line V1−L, the second vertical group VGroup2 may be configured as a group composed of pixels connected to the data line between a gate line V1−L+1 and a gate line V2−L, and the third vertical group VGroup3 may be configured as a group composed of pixels connected to the data line between a gate line V2−L+1 and a gate line V3−L. Accordingly, fewer pixels, which are connected to L gate lines, may be included in the first vertical group VGroup1, but more pixels, which are connected to the L gate lines, may be included in the third vertical group VGroup3.

Accordingly, as for the pixels connected to the data line between the gate line V1−L and the gate line V1, in the odd-numbered frame, a data voltage is obtained from an output buffer receiving a bias current 1235 applied to the first vertical group VGroup1, so a settling time 1330 of FIG. 13 is realized, and in the even-numbered frame, a data voltage is obtained from an output buffer receiving a bias current 1225 applied to the second vertical group VGroup2, so a settling time 1320 of FIG. 13 is realized. Accordingly, in the boundary region between the gate line V1−L and the gate line V1, in the odd-numbered frame, the settling time is decreased, but in the even-numbered frame, the settling time is increased, so on average, a medium settling time may be realized.

Similarly, as for pixels connected to the data line between the gate line V2−L and the gate line V2, in the odd-numbered frame, a data voltage is obtained from an output buffer receiving a bias current 1225 applied to the second vertical group VGroup2, so the settling time 1320 of FIG. 13 is realized, and in the even-numbered frame, a data voltage is obtained from an output buffer receiving a bias current 1215 applied to the third vertical group VGroup3, so a settling time 1310 of FIG. 13 is realized. Accordingly, in a boundary region between the gate line V2−L and the gate line V2, in the odd-numbered frame, the settling time is decreased, but in the even-numbered frame, the settling time is increased, so on average, a medium settling time may be realized.

Figure 15:
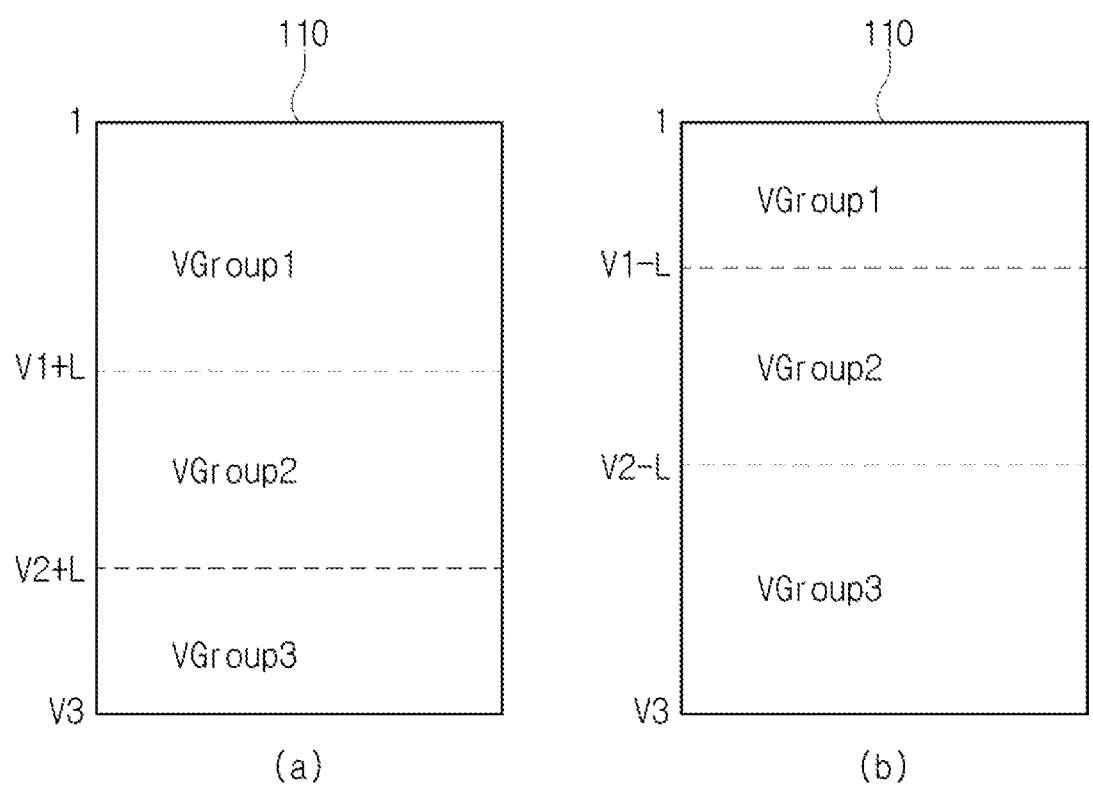
FIG. 15 shows views illustrating an interpolation method according to a "dual" method in parts (a) and (b).

FIG. 15 show views illustrating an interpolation method according to the "dual" method, in parts (a) and (b).

The parameter V_INTP_EN is set for the performance of interpolation, and when the dual method is set by the parameter V_INTP_Type, two consecutive frames may be set as one pair of frames.

Unlike the "single" method, as for the odd-numbered frame, a new group may be set by moving an initial group downward (to a position far from the data driver 130) from a preset position of the initial group as many as the number L of data lines set by the parameter V_INTP_Line. Referring to FIG. 15, part (a), the first vertical group VGroup1 may be configured as a group composed of pixels connected to a data line between a gate line 1 and a gate line V1+L, the second vertical group VGroup2 may be configured as a group composed of pixels connected to the data line between a gate line V1+L+1 and the gate line V2−L, and the third vertical group VGroup3 may be configured as a group composed of pixels connected to the data line between a gate line V2+L+1 and a gate line V3−L. Accordingly, more pixels, which are connected to L gate lines, may be included in the first vertical group VGroup1, but fewer pixels, which are connected to the L gate lines, may be included in the third vertical group VGroup3.

As for the even-numbered frame, a new group may be set by moving an initial group upward (to a position close to the data driver 130) from a preset position of the initial group as many as the number L of data lines set by the parameter V_INTP_Line. Referring to FIG. 15, part (b), the first vertical group VGroup1 may be configured as a group composed of pixels connected to a data line between a gate line 1 and the gate line V1−L, the second vertical group VGroup2 may be configured as a group composed of pixels connected to the data line between a gate line V1−L+1 and the gate line V2−L, and the third vertical group VGroup3 may be configured as a group composed of pixels connected to the data line between a gate line V2−L+1 and a gate line V3−L. Accordingly, fewer pixels, which are connected to L gate lines, may be included in the first vertical group VGroup1, but more pixels, which are connected to the L gate lines, may be included in the third vertical group VGroup3.

Accordingly, in a boundary region between the gate line V1−L and the gate line V1+L, in the odd-numbered frame, a data voltage is obtained from an output buffer receiving the bias current 1235 applied to the first vertical group VGroup1, so the settling time 1330 of FIG. 13 is realized, and in the even-numbered frame, a data voltage is obtained from an output buffer receiving the bias current 1225 applied to the second vertical group VGroup2, so the settling time 1320 of FIG. 13 is realized. Accordingly, in the boundary region between the gate line V1−L and the gate line V1+L, in the odd-numbered frame, the settling time is increased, but in the even-numbered frame, the settling time is decreased, so on average, a medium settling time may be realized.

Similarly, in a boundary region between the gate line V2−L and a gate line V2+L, in the odd-numbered frame, a data voltage is obtained from the output buffer receiving the bias current 1225 applied to the second vertical group VGroup2, so the settling time 1320 of FIG. 13 is realized, and in the even-numbered frame, a data voltage is obtained from an output buffer receiving the bias current 1215 applied to the third vertical group VGroup3, so the settling time 1310 of FIG. 13 is realized. Accordingly, in the boundary region between the gate line V2−L and the gate line V2+L, in the odd-numbered frame, the settling time is increased, but in the even-numbered frame, the settling time is decreased, so on average, a medium settling time may be realized.

As in the embodiment described above, although difference between the settling times between each group is reduced at the boundary between each of the groups by performing interpolation at the boundary, a visibility defect may still exist at the boundary. In order to prevent this, as an additional embodiment, a plurality of interpolations may be performed instead of a single interpolation.

Figure 16:
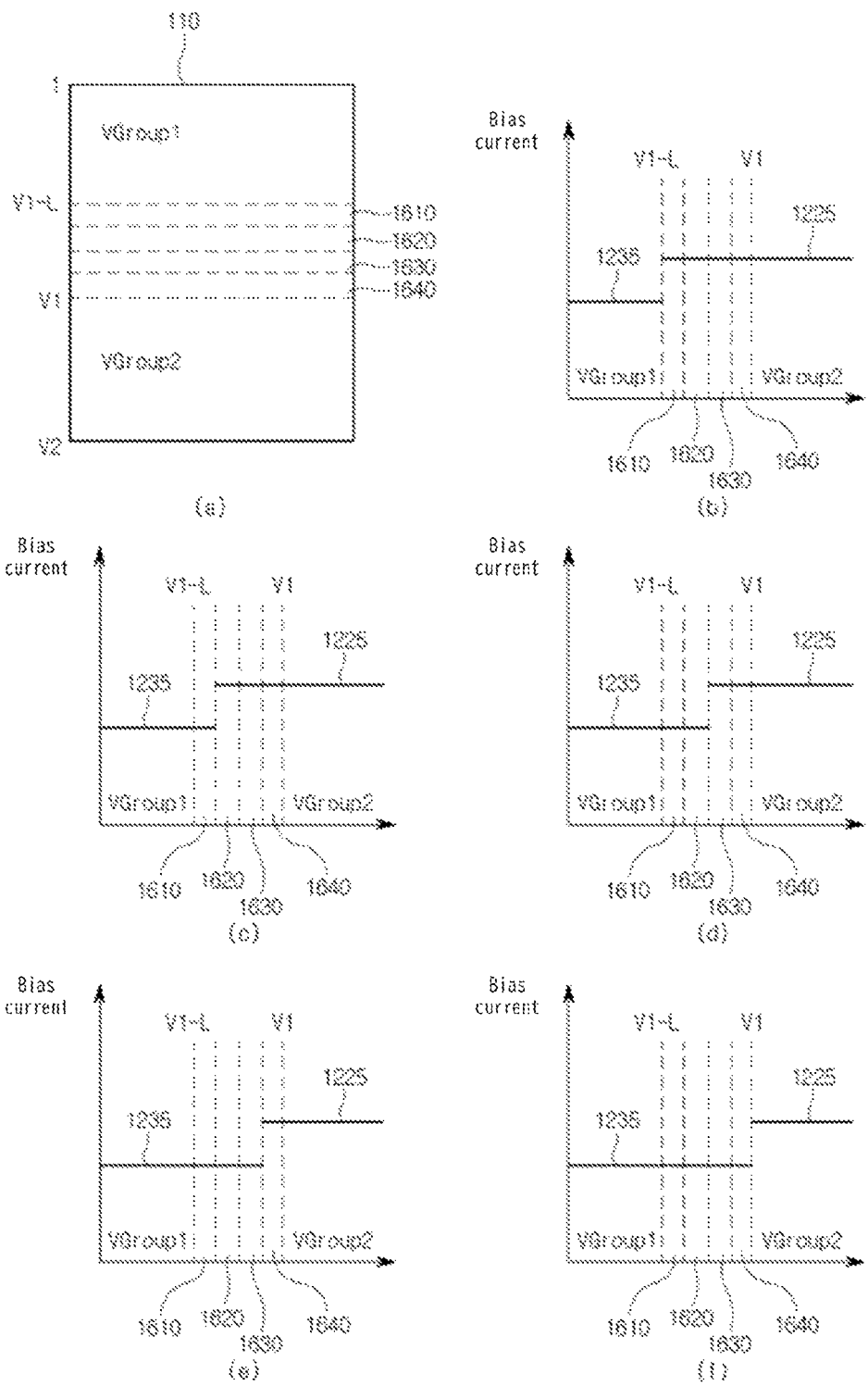
FIG. 16 shows views illustrating examples of performing a plurality of interpolations in boundary regions, respectively in parts (a), (b), (c), (d), (e), and (f)

FIG. 16 show views illustrating examples of grouping pixels for performing a plurality of interpolations in boundary regions, in parts (a), (b), (c), (d), (e), and (f), respectively.

The examples of FIG. 16, parts (a), (b), (c), (d), (e), and (f) illustrate the performances of a plurality of interpolations in a boundary region between the first vertical group VGroup1 and the second vertical group VGroup2 in FIG. 11, and in the same/similar manner, a plurality of interpolations may also be performed at a boundary region between the second vertical group VGroup2 and the third vertical group VGroup3 in the same.

In addition, the examples of FIG. 16, parts (a), (b), (c), (d), (e), and (f) illustrate the performances of the plurality of interpolations in the "single" method, but in the same/similar manner, the plurality of interpolations may be performed even in the "dual" method.

A parameter V_SG_No may be set to perform a plurality of interpolations by further subdividing an interpolation in a boundary region. When the parameter V_SG_No is set, the boundary region (gate lines ranging from V1−L to V1 illustrated in FIG. 16, parts (a), (b), (c), (d), (e), and (f)) may be divided into the sub-groups of the parameter V_SG_No+1.

For example, as illustrated in FIG. 16, part (a), when the parameter V_SG_No is set to be 3, the boundary region (the gate lines between V1−L and V1 in FIG. 16, parts (a), (b), (c), (d), (e), and (f)) may be divided into four regions (1610 to 1640).

Furthermore, as many frames as the parameter V_SG_No+2 are set as one frame set, and in each frame set, a bias current may be supplied to the output buffer of the data driver 130 as illustrated in FIG. 16, parts b), (c), (d), (e), and (f).

As illustrated in FIG. 16, part (b), in a frame 1, the bias current 1225 may be supplied to the second vertical group VGroup2, and the bias current 1235 may be supplied to the first vertical group VGroup1. The same the bias current 1225 as the bias current supplied to the second vertical group VGroup2 may be supplied even to the sub-groups 1610 to 1640 of the boundary region.

As illustrated in FIG. 16, part (c), in frame 2, an output buffer which supplies a data voltage to pixels which belong to the sub-groups 1610 receives the same bias current 1235 as a bias current supplied to an output buffer which generates a data voltage for the first vertical group VGroup1. Accordingly, as illustrated in FIG. 16, part (c), pixels which belong to the first vertical group VGroup1 and the sub-groups 1610 may receive a data voltage according to the bias current 1235, and pixels which belong to the second vertical group VGroup2 and the sub-groups 1620 to 1640 may receive a data voltage according to the bias current 1225.

As illustrated in FIG. 16, part (d), in frame 3, pixels which belong to the first vertical group VGroup1 and the sub-groups 1610 and 1620 may receive the data voltage according to the bias current 1235, and pixels which belong to the second vertical group VGroup2 and the sub-groups 1630 and 1640 may receive the data voltage according to the bias current 1225.

As illustrated in FIG. 16, part (e), in frame 4, pixels which belong to the first vertical group VGroup1 and the sub-groups 1610 to 1630 may receive the data voltage according to the bias current 1235, and pixels which belong to the second vertical group VGroup2 and the sub-groups 1640 may receive the data voltage according to the bias current 1225.

As illustrated in FIG. 16, part (f), in frame 5, pixels which belong to the first vertical group VGroup1 and the sub-groups 1610 to 1640 may receive the data voltage according to the bias current 1235, and pixels which belong to the second vertical group VGroup2 may receive the data voltage according to the bias current 1225. Due to such an operation, the magnitudes of bias currents for pixels which belong to the sub-groups, respectively, are different on average, and as each of the sub-groups is closer to the first vertical group VGroup1, a higher bias current may be used.

The performances of a plurality of interpolations as illustrated in FIG. 16, parts (a), (b), (c), (d), (e), and (f) may reduce difference between settling times at a boundary and may prevent a visibility defect at the boundary more than the performance of a single interpolation as illustrated in FIG. 14, parts (a) and (b) or FIG. 15, parts (a) and (b).

The touch driver 150 outputs the touch drive signal voltage to the touch electrode TE and detects a touch input by receiving a touch sensing signal from the touch electrode TE. In the embodiment, the display panel 110 may be configured to detect the touch input in the self-capacitance method. In such an embodiment, the touch driver 150 may detect the touch input through change in capacitance identified from the touch sensing signal. In this case, the touch driver 150 may have different sensitivity to the change in capacitance identified from the touch sensing signal according to a touch drive signal voltage applied to the touch electrode TE.

Figure 17:
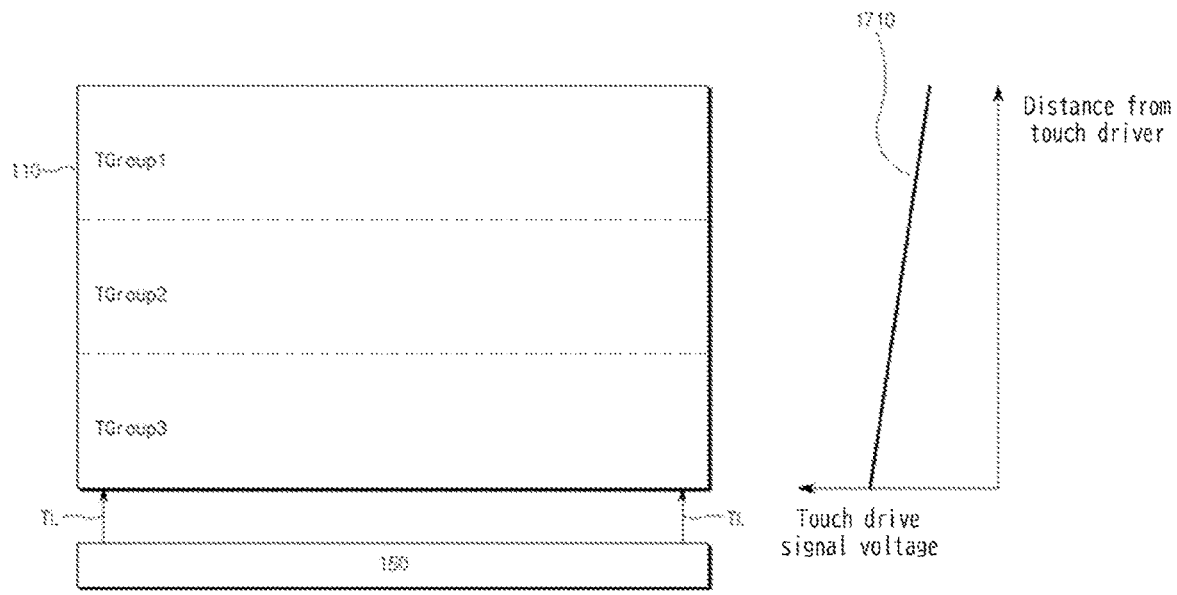
FIG. 17 is a view illustrating an example of a touch drive signal voltage detected by a touch electrode.

FIG. 17 is a view illustrating an example of the touch drive signal voltage detected by the touch electrode.

Referring to the touch drive signal voltage 1710 illustrated in FIG. 17, as a distance between the touch electrode TE and the touch driver 150 increases, the magnitude of the touch drive signal voltage 1710 detected by the touch electrode may decrease according to voltage attenuation due to internal load resistance. Accordingly, in order to enable detection performed by a touch electrode farthest from the touch driver 150, the touch driver 150 may apply a touch drive signal voltage to the touch electrode, which is larger than a touch drive signal voltage required for the detection. As a result, a touch electrode adjacent to the touch driver 150 detects a large touch drive signal voltage and may be increased in touch sensitivity. In addition, in a case in which the touch driver 150 applies a single touch drive signal voltage, the touch sensitivity may be set to be different according to the distance between the touch electrode and the touch driver. That is, a touch electrode group TGroup3 located at a region close to the touch driver 150 may have higher touch sensitivity and a touch electrode group TGroup1 located at a region far from the touch driver 150 may have a lower touch sensitivity.

For description in a different manner, to satisfy a touch performance, in the case of the application of a touch drive signal voltage relative to a touch electrode which belongs to the touch electrode group TGroup1, touch drive signal voltages which are unnecessarily high may be applied to touch electrodes which belong to a touch electrode group TGroup2 and the touch electrode group TGroup3. Accordingly, even if low touch drive signal voltages are applied to the touch electrodes which belong to the touch electrode group TGroup2 and the touch electrode group TGroup3, it may be sufficient, and as a result, power consumption can be reduced.

Figure 18:
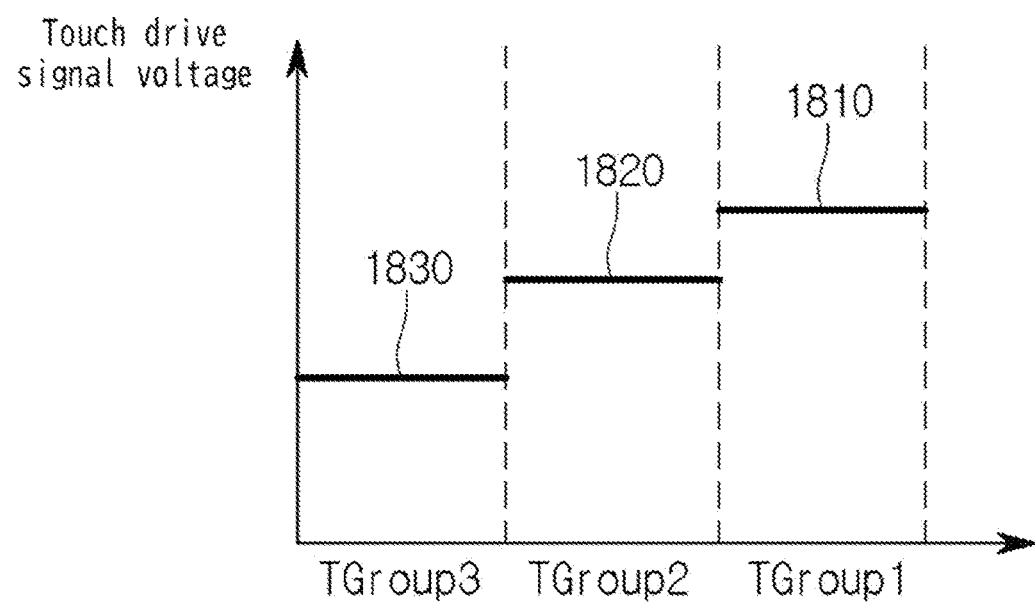
FIG. 18 is a graph illustrating an example of the touch drive signal voltage which a touch driver applies to each of divided touch electrode groups.

FIG. 18 is a graph illustrating an example of a touch drive signal voltage which the touch driver 150 applies to each of the divided touch electrode groups.

As illustrated in FIG. 18, a touch drive signal voltage 1830 low enough to satisfy the touch performance may be applied to a touch electrode which belongs to the touch electrode group TGroup3 adjacent to the touch driver 150, and a touch drive signal voltage 1810 high enough to satisfy the touch performance may be applied to a touch electrode which belongs to the touch electrode group TGroup1 located at a position far from the touch driver 150.

In order to realize the method of reducing power consumption described above, in the display device 100, the touch electrodes TE may be divided into a plurality of touch electrode groups on the basis of a distance between each of the touch electrodes TE and the touch driver 150. In the display device 100, the parameter V_Group_No may be set to set the number of the touch electrode groups. According to the embodiment, the parameter V_Group_No may be 3-bit parameter. Accordingly, the number of the touch electrode groups may be determined to be any one of 1 to 8.

In addition, the display device 100 may set a parameter LFD_V_Step. The parameter LFD_V_Step may be a value which sets the differences of touch drive signal voltages between the touch electrode groups.

The touch driver 150 of the display device 100 may reduce the touch drive signal voltage of each of the groups by a voltage set in the parameter LFD_V_Step gradually toward a touch electrode group TGroup3 located at a position closest to the touch driver 150 from a touch electrode group TGroup1 located at a position farthest from the touch driver 150. In this case, a minimum voltage that each group can have may be set. For example, when a minimum touch drive signal voltage is 2.6V, the touch drive signal voltage for each group cannot be less than 2.6V.

For example, when a touch drive signal voltage for a group farthest from the touch driver 150 is set to be 3.3V, the parameter V_Group_No is set to be 3, and the parameter LFD_V_Step is set to be 0.1V, the touch drive signal voltage for each touch electrode group may be 3.3V, 3.2V, and 3.1V.

According to another embodiment, the touch drive signal voltage for the touch electrode group farthest from the touch driver 150 is set to be 2.8V, the parameter V_Group_No is set to be 4, the parameter LFD_V_Step is set to be 0.1V, and the minimum touch drive signal voltage is set to be 2.6V. The touch drive signal voltage for each touch electrode group may be 2.8V, 2.7V, 2.6V, and 2.6V. Here, the touch drive signal voltage for the touch electrode group closest to the touch driver 150 may not be less than the minimum touch drive signal voltage and thus may be 2.6V.

In order to simply embody the above-described analog setting, a preset table of the touch drive signal voltage may be used. For example, on the basis of a parameter LFD_V indicating a touch drive signal voltage for a group farthest from the touch driver 150, the table of the touch drive signal voltage may be set. According to the embodiment, when the parameter LFD_V is configured as a 3-bit parameter, the table of the touch drive signal voltage may be configured for each value of the parameter LFD_V as illustrated in Table 1.

TABLE 1

| LFD_V | Touch drive signal voltage |
|---|---|
| LLL | 2.6 V |
| LLH | 2.7 V |
| LHL | 2.8 V |
| LHH | 2.9 V |
| HLL | 3.0 V |
| HLH | 3.1 V |

TABLE 1-continued

| LFD_V | Touch drive signal voltage |
|---|---|
| HHL | 3.2 V |
| HHH | 3.3 V |

Referring to table 1, when the touch driver 150 receives "HHH" as the value of the parameter LFD_V, the touch driver 150 may recognize that a touch drive signal voltage for a group farthest from the touch driver 150 is 3.3V. In addition, when the touch driver 150 receives the value of 1 as the parameter LFD_V_Step, the touch driver 150 may determine the touch drive signal voltage of a next group by decreasing the value of the parameter LFD_V by 1 (that is, "HHH"->"HHL"->"HLH"). Accordingly, the touch drive signal voltage for each touch electrode group may be 3.3V, 3.2V, and 3.1V.

According to another embodiment, when the touch driver 150 receives the value of 2 as the parameter LFD_V_Step, the touch driver 150 may determine the touch drive signal voltage of a next group by decreasing the value of the parameter LFD_V by 2 (that is, "HHH"-> "HLH", ->"LHH"). Accordingly, the touch drive signal voltage for each touch electrode may be 3.3V, 3.1V, and 2.9V.

Figure 19:
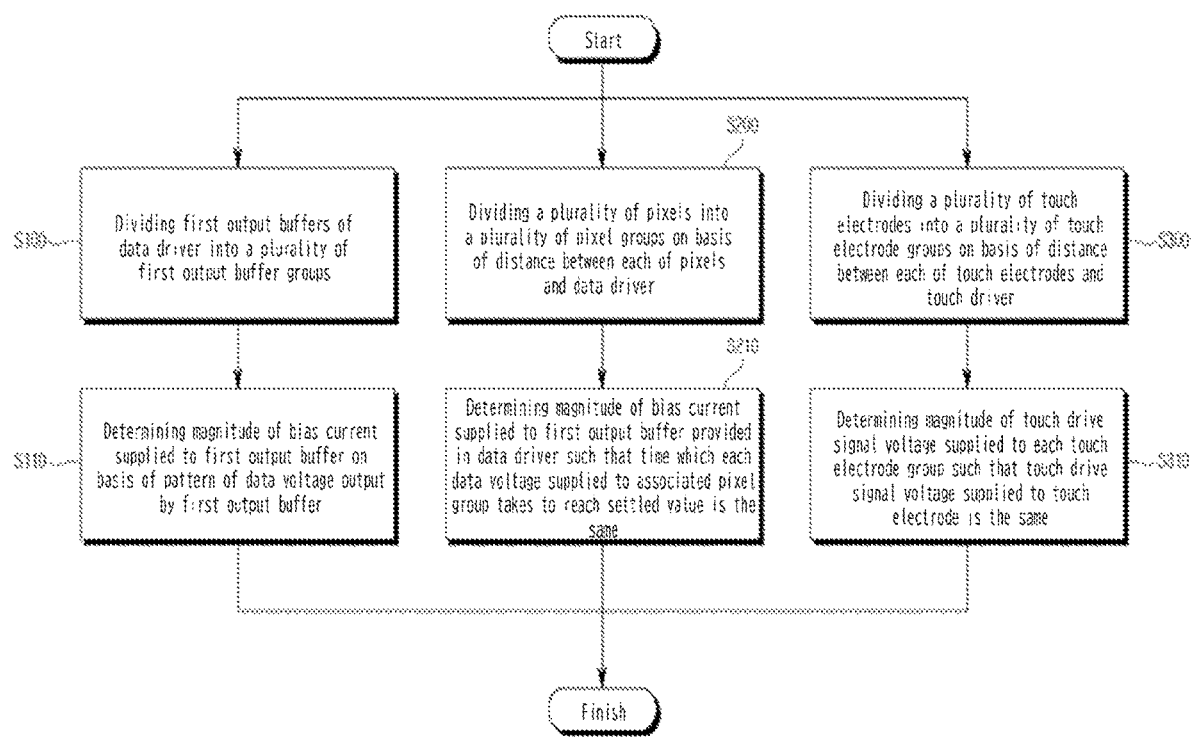
FIG. 19 is a diagram illustrating the driving method of the display device proposed by the present disclosure.

FIG. 19 is a diagram illustrating the driving method of the display device proposed by the present disclosure.

Referring to FIG. 19, at S100, in the display device, a plurality of first output buffers provided in the data driver which apply a data voltage to each of a plurality of data lines connected with the display panel may be divided into a plurality of first output buffer groups.

According to the display device, at S110, the magnitude of a bias current supplied to the first output buffer provided in the data driver may be determined on the basis of the pattern of a data voltage output by the first output buffer which belongs to each of the plurality of divided first output buffer groups.

In addition, in order to remove the possibility of a visibility defect at a boundary between each group, the display device may perform an interpolation which allows an output buffer located at the boundary between each of the groups to receive a different bias current. The interpolation may be performed by changing data lines belonging to the groups illustrated in FIG. 9, parts (a), (b), and (c) in the odd-numbered frame and the even-numbered frame.

According to the display device, at S200, a plurality of pixels provided in a matrix form on the display panel may be divided into a plurality of pixel groups on the basis of a distance between each of the pixels and the data driver of the display device.

According to the display device, at S210, a bias current of the first output buffer provided in the data driver and configured to output the data voltage to each of the data lines may be determined such that time which a data voltage output to a data line connected to each of the plurality of pixel groups takes to reach a preset voltage (a settled value) in the last pixel of the associated pixel group is the same in each of the plurality of pixel groups.

In addition, in order to remove the possibility of a visibility defect at a boundary between groups, the display device may perform interpolation allowing output buffers located at the boundary between the groups to receive different bias currents. The interpolation may be performed by changing pixels which belongs to each group illustrated in FIG. 14, parts (a) and (b), FIG. 15, parts (a) and (b), and FIG. 16, parts (a), (b), (c), (d), (e), and (f) in the odd-numbered frame and the even-numbered frame, or in a set of a plurality of frames.

According to the display device, at S300, a plurality of touch electrodes provided in the display panel may be divided into a plurality of touch electrode groups on the basis of a distance between each of the touch electrodes and the touch driver provided in the display device.

According to the display device, at S310, the magnitude of a touch drive signal voltage supplied to each of the plurality of touch electrode groups may be determined such that the touch drive signal voltage supplied to a touch electrode which is located in each of the plurality of touch electrode groups and is located at a position farthest from the touch driver is the same.

According to the various embodiments, S100 and S110, S200 and S210, and S300 and S310 illustrated in FIG. 19 may be operated separately from each other, and may be operated together with each other.

As described above, according to the present disclosure, data lines are divided into a plurality of data line groups, respectively, and according to the shape of a data signal transmitted from the associated group, the magnitude of a bias current to be supplied is changed.

In addition, according to the present disclosure, pixels are divided into a plurality of pixel groups according to a distance between each of pixels and the gate driver 120, and bias currents for the pixel groups are different such that settling times of data voltages reaching pixels in each of the pixel groups can be maintained to be similar to each other. Furthermore, in order to prevent a visibility defect at a boundary between each group, various interpolation methods are proposed.

In addition, the present disclosure proposes the method of reducing power consumption by dividing the touch electrode into a plurality of groups according to a distance from the touch driver 150 and varying the touch drive signal voltage for each of the groups.

According to the proposed method described above, power consumption of the display device 100 can be significantly reduced.

What is claimed is:
1. A display device comprising:
a display panel having a plurality of pixels disposed in a matrix form thereon;
a timing controller configured to process an image signal and a control signal received from an outside and to generate data, a data drive control signal, and a gate drive control signal for outputting the image signal to the display panel; and
a data driver comprising output buffers configured to output a corresponding data voltage to each of a plurality of data lines of the display panel,
wherein the plurality of data lines are divided into a plurality of data line groups, respectively, and
the data driver supplies a bias current having a different magnitude for each of the data line groups to each of the output buffers which drive data lines which belong to the plurality of data line groups, respectively,
wherein among the plurality of data line groups, a magnitude of a bias current supplied to an output buffer corresponding to a data line group comprising at least one data line to which a data voltage having a toggle pattern is applied is larger than a magnitude of a bias current supplied to an output buffer corresponding to a data line group which does not comprise a data line to which a data voltage having a toggle pattern is applied.

2. The display device of claim 1, wherein based on pattern recognition results on the data which are required to be output to the data lines which belong to the plurality of data line groups, respectively, the bias currents supplied to the output buffers corresponding to the plurality of data line groups, respectively, have different magnitudes.

3. The display device of claim 2, wherein an applicable maximum bias current is supplied to a data line group comprising at least one data line to which an outputting data voltage having a toggle pattern is applied.

4. The display device of claim 3, wherein a corresponding 1-bit bias control signal is provided for each of the plurality of data line groups,
   wherein the bias control signal is generated such that a first logic value is set for a bit corresponding to the data line group which receives the applicable maximum bias current, and a second logic value is set for a bit corresponding to each of remaining data line groups, the bias control signal being applied to the data driver.

5. The display device of claim 4, wherein on a basis of the bias control signal, the data driver supplies the applicable maximum bias current to a first output buffer for the data line group corresponding to the bit for which the first logic value is set, and supplies the bias current to a first output buffer for the data line group corresponding to the bit for which the second logic value is set, the bias current being obtained by subtracting a magnitude of a preset current from the applicable maximum bias current supplied to the first output buffer for the adjacent data line group.

6. The display device of claim 5, wherein the data driver is provided with a bias part for each of the plurality of data line groups,
   wherein the bias part comprises:
   a plurality of constant current sources having the same magnitudes, and
   a plurality of switches for connecting each of the plurality of constant current sources to the first output buffer for the data line group,
   wherein the data driver controls the plurality of switches on a basis of a magnitude of a current to be supplied to a first output buffer for each of the plurality of data line groups.

7. The display device of claim 1, wherein the plurality of pixels are divided into a plurality of pixel groups on a basis of a distance between each of the pixels and the data driver, and
   the data driver supplies a bias current having a different magnitude to a first output buffer for each of the plurality of pixel groups such that time which a data voltage output to each of the data lines connected to the plurality of pixel groups takes to reach a preset voltage (a settled value) in a last pixel of an associated pixel group is the same in each of the plurality of pixel groups.

8. The display device of claim 1, wherein the display panel further comprises touch electrodes, and
   the display device further comprises a touch driver configured to supply a touch drive signal voltage to each of the touch electrodes of the display panel,
   wherein the plurality of touch electrodes is divided into a plurality of touch electrode groups on a basis of a distance between each of the touch electrodes and the touch driver, and
   the touch driver supplies a different touch drive signal voltage to each of the plurality of touch electrode groups such that the touch drive signal voltage supplied to each of the touch electrodes which are located in each of the plurality of touch electrode groups and are located at positions, respectively, farthest from the touch driver is the same.

9. The display device of claim 1, wherein among the plurality of data line groups, a magnitude of a bias current supplied to a first output buffer corresponding to a data line group comprising at least one data line to which a data voltage having a toggle pattern is applied is larger than a magnitude of a bias current supplied to a second output buffer corresponding to a data line group which does not comprise a data line to which a data voltage having a toggle pattern is applied.

10. A display device comprising:
    a display panel having a plurality of pixels disposed in a matrix form thereon;
    a timing controller configured to process an image signal and a control signal received from an outside and to generate data, a data drive control signal, and a gate drive control signal for outputting the image signal to the display panel; and
    a data driver comprising an output buffer configured to output a data voltage to each of a plurality of data lines of the display panel,
    wherein the plurality of data lines are divided into a plurality of data line groups, respectively, and
    the data driver supplies a bias current having a different magnitude for each of the data line groups to each of output buffers which drive data lines which belong to the plurality of data line groups, respectively,
    wherein in order to perform an interpolation for preventing a visibility defect at a boundary between each of the plurality of data line groups, a data line group which is located at a position adjacent to the boundary between each of the plurality of data line groups and has data lines preset in number is set to be changed in an even-numbered frame and an odd-numbered frame.

11. The display device of claim 10, wherein when bias currents supplied to first output buffers for data line groups at opposite sides of the boundary have the same magnitudes, the data line group to which the data lines belong is set not to be changed in the even-numbered frame and the odd-numbered frame.

12. A display device comprising:
    a display panel having a plurality of pixels disposed in a matrix form thereon;
    a timing controller configured to process an image signal and a control signal received from an outside and to generate data, a data drive control signal, and a gate drive control signal for outputting the image signal to the display panel; and
    a data driver comprising an output buffer configured to output a data voltage to each of a plurality of data lines of the display panel,
    wherein the plurality of data lines are divided into a plurality of data line groups, respectively, and
    the data driver supplies a bias current having a different magnitude for each of the data line groups to each of output buffers which drive data lines which belong to the plurality of data line groups, respectively,
    wherein the plurality of pixels are divided into the plurality of pixel groups on a basis of a distance between each of the pixels and the data driver, and
    the data driver supplies a bias current having a different magnitude to a first output buffer for each of the plurality of pixel groups such that time which a data voltage output to each of data lines connected to the plurality of pixel groups takes to reach a preset voltage (a settled value) in a last pixel of an associated pixel group is the same in each of the plurality of pixel groups, wherein in order to perform an interpolation for preventing a visibility defect at a boundary between each of the plurality of pixel groups, a pixel group which is located at a position adjacent to the boundary between each of the plurality of pixel groups and has pixels preset in number is set to be changed in an even-numbered frame and an odd-numbered frame.

13. The display device of claim 12, wherein in the odd-numbered frame, settings of the plurality of pixel groups are maintained, and in the even-numbered frame, pixels which each of the plurality of pixel groups comprises are changed such that each of the plurality of set pixel groups is moved by a preset number to a first side toward the data driver or to a second side away from the data driver.

14. The display device of claim 12, wherein in the odd-numbered frame, pixels which each of the plurality of pixel groups comprises are changed such that each of the plurality of set pixel groups is moved by a preset number to a side toward the data driver, in the even-numbered frame, pixels which each of the plurality of pixel groups comprises are changed such that each of the plurality of set pixel groups is moved by a preset number to a side far from the data driver.

15. A display device comprising:

a display panel having a plurality of pixels disposed in a matrix form thereon;

a timing controller configured to process an image signal and a control signal received from an outside and to generate data, a data drive control signal, and a gate drive control signal for outputting the image signal to the display panel; and a data driver comprising an output buffer configured to output a data voltage to each of a plurality of data lines of the display panel, wherein the plurality of data lines are divided into a plurality of data line groups, respectively, and the data driver supplies a bias current having a different magnitude for each of the data line groups to each of output buffers which drive data lines which belong to the plurality of data line groups, respectively, wherein the plurality of pixels are divided into a plurality of pixel groups on a basis of a distance between each of the pixels and the data driver, and the data driver supplies a bias current having a different magnitude to a first output buffer for each of the plurality of pixel groups such that time which a data voltage output to each of data lines connected to the plurality of pixel groups takes to reach a preset voltage (a settled value) in a last pixel of an associated pixel group is the same in each of the plurality of pixel groups, wherein in order to perform a plurality of interpolations for preventing a visibility defect at a boundary between each of the plurality of pixel groups, an interpolation area is set for performing an interpolation at a surrounding area of the boundary, the interpolation area is divided into n sub-groups, and a frame set is configured by n+1 frames greater by 1 than the number of the sub-groups, so a data voltage applied to a pixel which belongs to each of the n sub-groups is changed from a first pixel group toward a second pixel group adjacent thereto in frames different from each other inside the frame set.

16. A driving method of a display device, the method comprising:

dividing a plurality of output buffers of a data driver into a plurality of output buffer groups, each of the plurality of output buffers being configured to apply a data voltage to each of a plurality of data lines connected with a display panel, and determining a magnitude of a bias current supplied to the output buffer on a basis of a pattern of the data voltage output by the output buffer which belongs to each of the plurality of divided output buffer groups, wherein among a plurality of data line groups, a magnitude of a bias current supplied to the output buffer group corresponding to the data line group comprising at least one data line to which a data voltage having a toggle pattern is applied is larger than a magnitude of a bias current supplied to the output buffer group corresponding to the data line group which does not comprise a data line to which a data voltage having a toggle pattern is applied.

17. The method of claim 16, further comprising:

dividing a plurality of pixels provided in a matrix form in the display panel into a plurality of pixel groups on a basis of a distance between each of the plurality of pixels and the data driver of the display device, and determining the bias current of the output buffer provided in the data driver and configured to output the data voltage to each of the data lines such that time which a data voltage supplied to each of the plurality of pixel groups by being output to each of the data lines takes to reach a preset voltage in a last pixel of an associated pixel group is the same in each of the plurality of pixel groups.

18. The display device of claim 17, further comprising:

dividing a plurality of touch electrodes provided in the display panel into a plurality of touch electrode groups on a basis of a distance between each of the plurality of touch electrodes and a touch driver provided in the display device, and determining a magnitude of a touch drive signal voltage supplied to each of the plurality of touch electrode groups such that the touch drive signal voltage supplied to each of the touch electrodes which are located in each of the plurality of touch electrode groups and are located at positions, respectively, farthest from the touch driver is the same.

* * * * *